(12) United States Patent     (10) Patent No.:   US 12,588,053 B2

Liu et al.     (45) Date of Patent:   Mar. 24, 2026

(54) TRANSMISSION METHOD AND APPARATUS, PRIORITY DEFINITION METHOD AND APPARATUS, AND COMMUNICATION DEVICE

(71) Applicant: VIVO MOBILE COMMUNICATION CO., LTD., Guangdong (CN)

(72) Inventors: Siqi Liu, Guangdong (CN); Zichao Ji, Guangdong (CN); Huan Wang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 311 days.

(21) Appl. No.: 18/300,896

(22) Filed: Apr. 14, 2023

(65) Prior Publication Data

US 2023/0254889 A1     Aug. 10, 2023

Related U.S. Application Data

(63) Continuation of application No. PCT/CN2021/123819, filed on Oct. 14, 2021.

(30) Foreign Application Priority Data

Oct. 15, 2020    (CN) .......................... 202011104821.1

(51) Int. Cl.
    *H04W 72/563*      (2023.01)
    *H04W 72/40*       (2023.01)

(52) U.S. Cl.
    CPC ......... *H04W 72/563* (2023.01); *H04W 72/40* (2023.01)

(58) Field of Classification Search
    CPC .... H04W 72/56; H04W 72/563; H04W 72/40
    See application file for complete search history.

(56) References Cited

U.S. PATENT DOCUMENTS

2018/0316395 A1   11/2018   Sundararajan et al.
2020/0112989 A1    4/2020   Zeng et al.
(Continued)

FOREIGN PATENT DOCUMENTS

CN      110290560 A    9/2019
CN      110838899 A    2/2020
(Continued)

OTHER PUBLICATIONS

International Search Report and Written Opinion for Application No. PCT/CN2021/123819, dated Jan. 14, 2022, 9 Pages.
(Continued)

*Primary Examiner* — Kenny S Lin
(74) *Attorney, Agent, or Firm* — Foley & Lardner LLP

(57) ABSTRACT

A transmission method and apparatus, a priority definition method and apparatus, and a terminal are provided. The transmission method applicable to a communication device includes: determining target transmission when a target resource and a first resource at least partially overlap, meet a collision condition, or meet a multiplexing condition, where the target resource is related to a sidelink SL, the target resource has or does not have a first Uu priority, the first resource has or does not have a second Uu priority, and the first Uu priority of the target resource includes a Uu priority of the target resource and/or a Uu priority of at least part of information corresponding to the target resource.

20 Claims, 3 Drawing Sheets

(56) References Cited

U.S. PATENT DOCUMENTS

| | | | | |
|---|---|---|---|---|
| 2020/0204308 | A1 | 6/2020 | Chen | |
| 2020/0351911 | A1 | 11/2020 | Tang | |
| 2020/0396701 | A1* | 12/2020 | Yi | H04W 72/569 |
| 2021/0028891 | A1* | 1/2021 | Zhou | H04W 4/40 |
| 2021/0105126 | A1* | 4/2021 | Yi | H04W 76/27 |
| 2021/0168826 | A1 | 6/2021 | Zhao | |
| 2021/0219170 | A1 | 7/2021 | Ji et al. | |
| 2022/0007231 | A1* | 1/2022 | Basu Mallick | H04W 28/0284 |
| 2022/0103292 | A1* | 3/2022 | Hwang | H04L 1/1812 |
| 2022/0174682 | A1* | 6/2022 | Li | H04W 72/1263 |
| 2022/0330268 | A1* | 10/2022 | Guo | H04L 1/1812 |
| 2022/0360950 | A1* | 11/2022 | Li | H04L 5/0051 |
| 2022/0394674 | A1* | 12/2022 | Chen | H04W 72/0446 |

FOREIGN PATENT DOCUMENTS

| | | | | |
|---|---|---|---|---|
| CN | 110972195 | A | 4/2020 | |
| CN | 111148281 | A | 5/2020 | |
| CN | 111247859 | A | 6/2020 | |
| EP | 3905770 | A1* | 11/2021 | H04W 72/02 |
| EP | 4017196 | A1 | 6/2022 | |
| EP | 4090089 | A1 | 11/2022 | |

OTHER PUBLICATIONS

Extended European Search Report for Application No. 21879492.3, dated Mar. 13, 2024.

CMCC "Remaining issues on mode-1 resource allocation mechanism" 3GPP TSG RAN WG1 #101, e-Meeting, May 2020, RI-2003950, 6 Pages.

CMCC "Remaining issues on physical layer procedures for sidelink" 3GPP TSG RAN WGI #101, e-Meeting, May 2020, RI-2003952, 8 Pages.

First Office Action for Indian Application No. 202317030648, dated May 30, 2024, 7 Pages.

First Office Action for Japanese Application No. 2023-522466, dated Apr. 2, 2024, 3 Pages.

* cited by examiner

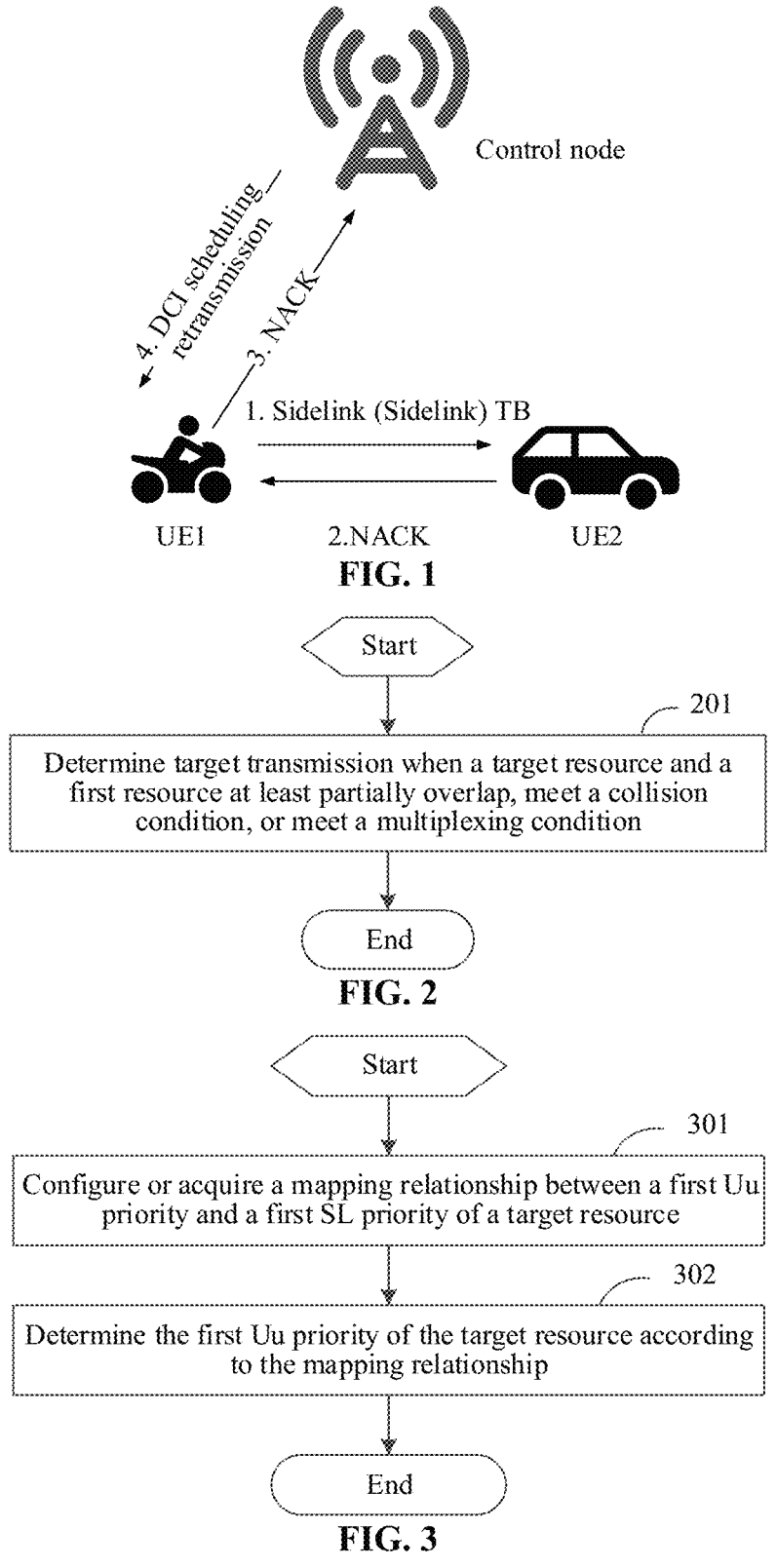

Control node

4. DCI scheduling retransmission

3. NACK

1. Sidelink (Sidelink) TB

UE1    2.NACK    UE2

FIG. 1

Start

201

Determine target transmission when a target resource and a first resource at least partially overlap, meet a collision condition, or meet a multiplexing condition End

FIG. 2

Start

301

Configure or acquire a mapping relationship between a first Uu priority and a first SL priority of a target resource

302

Determine the first Uu priority of the target resource according to the mapping relationship End

FIG. 3

TRANSMISSION METHOD AND APPARATUS, PRIORITY DEFINITION METHOD AND APPARATUS, AND COMMUNICATION DEVICE

CROSS-REFERENCE TO RELATED APPLICATIONS

This application is a continuation of PCT International Application No. PCT/CN2021/123819 filed on Oct. 14, 2021, which claims priority to Chinese Patent Application No. 202011104821.1 filed on Oct. 15, 2020, which are incorporated herein by reference in their entireties.

TECHNICAL FIELD

The present application relates to the technical field of communications, and specifically, to a transmission method and apparatus, a priority definition method and apparatus, and a communication device.

BACKGROUND

In a mobile communication system, if the physical uplink shared channel (Physical Uplink Shared Channel, PUSCH) and the physical uplink control channel (Physical Uplink Control Channel, PUCCH) carrying the hybrid automatic repeat request acknowledgement (Hybrid automatic repeat request acknowledgement, HARQ ACK) for Uu overlap, only when the Uu priorities corresponding to the PUSCH and the PUCCH are the same, the HARQ ACK for Uu on the PUCCH can be multiplexed on the PUSCH; otherwise, the HARQ ACK cannot be multiplexed on the PUSCH.

The definitions of sidelink (sidelink, SL) priority and Uu priority are different, and when the PUSCH carrying data and the PUCCH/PUSCH carrying sidelink HARQ-ACK overlap, whether the PUSCH can multiplex the sidelink HARQ-ACK and how the PUSCH multiplexes the sidelink HARQ-ACK are unclear.

SUMMARY

According to a first aspect, an embodiment of the present application provides a transmission method, applicable to a communication device, the method including:
    determining target transmission when a target resource and a first resource at least partially overlap, meet a collision condition, or meet a multiplexing condition, where
    the target resource is related to an SL, the target resource has or does not have a first Uu priority, the first resource has or does not have a second Uu priority, and the first Uu priority of the target resource includes a Uu priority of the target resource and/or a Uu priority of at least part of information corresponding to the target resource.

According to a second aspect, an embodiment of the present application provides a priority definition method, applicable to a communication device, the method including:
    configuring or acquiring a mapping relationship between a first Uu priority and a first SL priority of a target resource; and
    determining the first Uu priority of the target resource according to the mapping relationship, where
    the target resource is related to an SL, the first Uu priority of the target resource includes a Uu priority of the target resource and/or a Uu priority of at least part of information corresponding to the target resource; and the first SL priority of the target resource includes an SL priority of the target resource and/or a sidelink SL priority of the at least part of information corresponding to the target resource.

According to a third aspect, an embodiment of the present application provides a transmission apparatus, applicable to a communication device, the apparatus including:
    a first determining module, configured to determine target transmission when a target resource and a first resource at least partially overlap, meet a collision condition, or meet a multiplexing condition, where
    the target resource is related to a sidelink SL, the target resource has or does not have a first Uu priority, the first resource has or does not have a second Uu priority, and the first Uu priority of the target resource includes: a Uu priority of the target resource and/or a Uu priority of at least part of information corresponding to the target resource.

According to a fourth aspect, an embodiment of the present application provides a priority definition apparatus, applicable to a communication device, the apparatus including:
    a processing module, configured to configure or acquire a mapping relationship between a first Uu priority and a first SL priority of a target resource; and
    a second determining module, configured to determine the first Uu priority of the target resource according to the mapping relationship, where
    the target resource is related to an SL, and the first Uu priority of the target resource includes: a Uu priority of the target resource and/or a Uu priority of at least part of information corresponding to the target resource; and the first SL priority of the target resource includes: an SL priority of the target resource and/or a sidelink SL priority of the at least part of information corresponding to the target resource.

According to a fifth aspect, an embodiment of the present application provides a communication device, including: a processor, a memory, and a program or instructions stored on the memory and executable on the processor, the program or instructions, when executed by the processor, implementing the steps of the transmission method according to the first aspect, or implementing the steps of the priority definition method according to the second aspect.

According to a sixth aspect, an embodiment of the present application provides a readable storage medium. The readable storage medium stores a program or instructions, the program or instructions, when executed by a processor, implementing the steps of the transmission method according to the first aspect, or implementing the steps of the priority definition method according to the second aspect.

According to a seventh aspect, an embodiment of the present application provides a chip. The chip includes a processor and a communication interface, the communication interface being coupled to the processor, and the processor being configured to run a program or instructions, to implement the steps of the transmission method according to the first aspect, or implement the steps of the priority definition method according to the second aspect.

According to an eighth aspect, a computer program product is provided. The computer program product is stored in a non-volatile storage medium, and executed by at least one processor to implement the method according to the first aspect, or implement the method according to the second aspect.

BRIEF DESCRIPTION OF THE DRAWINGS

FIG. 1 is a schematic diagram of an existing sidelink communication architecture;

FIG. 2 is a schematic flowchart of a transmission method according to an embodiment of the present application;

FIG. 3 is a schematic flowchart of a priority definition method according to an embodiment of the present application;

DETAILED DESCRIPTION

Figure 4:
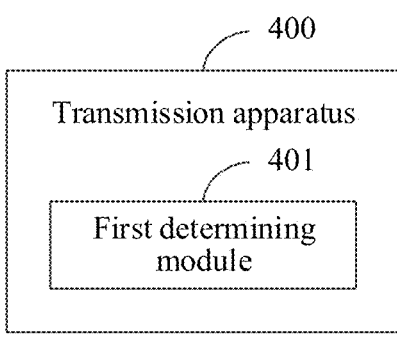
FIG. 4 is a schematic structural diagram of a transmission apparatus according to an embodiment of the present application.

The following clearly describes the technical solutions in the embodiments of the present application with reference to the accompanying drawings in the embodiments of the present application. Apparently, the described embodiments are some rather than all of the embodiments of the present application. All other embodiments obtained by a person of ordinary skill in the art based on the embodiments of the present application without creative efforts shall fall within the protection scope of the present application.

The terms such as "first" and "second" in the specification and the claims of the present application are intended to distinguish between similar objects, but are not used for describing a specific sequence or a chronological order. It is to be understood that the terms used in such a way are interchangeable in appropriate circumstances, so that the embodiments of the present application can be implemented in orders other than the order illustrated or described herein. In addition, the objects distinguished by "first" and "second" are generally of one type, and the quantity of the objects is not limited. For example, there may be one or more first objects. In addition, "and/or" used in the specification and the claims represents at least one of the connected objects, and the character "/" generally indicates an "or" relationship between the associated objects.

It is to be noted that the technologies described in the embodiments of the present application are not limited to the Long Term Evolution (Long Term Evolution, LTE)/LTE-advanced (LTE-Advanced, LTE-A) system, and may further be applied to other wireless communication systems such as Code Division Multiple Access (Code Division Multiple Access, CDMA), Time Division Multiple Access (Time Division Multiple Access, TDMA), Frequency Division Multiple Access (Frequency Division Multiple Access, FDMA), Orthogonal Frequency Division Multiple Access (Orthogonal Frequency Division Multiple Access, OFDMA), Single-carrier Frequency-Division Multiple Access (Single-carrier Frequency-Division Multiple Access, SC-FDMA), and other systems. The terms "system" and "network" in the embodiments of the present application are often used interchangeably. The described technology can be applied to the systems and radio technologies mentioned above, and can also be applied to other systems and radio technologies. The following description describes the new radio (New Radio, NR) system for example purposes, and NR terminology is used in most of the following descriptions. However, these technologies can also be applied to applications other than NR system applications, for example, the $6^{th}$ generation ($6^{th}$ Generation, 6G) communication system.

In the embodiments of the present application, the communication device may be a terminal or a network-side device. The terminal may also be referred to as a terminal device or a user terminal (User Equipment, UE). The terminal may be a terminal-side device such as a mobile phone, a tablet computer (Tablet Personal Computer), a laptop computer (Laptop Computer), or referred to as a notebook computer, a personal digital assistant (Personal Digital Assistant, PDA), a handheld computer, a netbook, an ultra-mobile personal computer (ultra-mobile personal computer, UMPC), a mobile Internet device (Mobile Internet Device, MID), a wearable device (Wearable Device) or a vehicle user equipment (VUE), or a pedestrian user equipment (PUE), where the wearable device includes: a bracelet, a headset, glasses, or the like. It is to be noted that, a specific type of the terminal is not limited in the embodiments of the present application. The network-side device may be a base station. The base station may be referred to as a node B, an evolved node B, an access point, a base transceiver station (Base Transceiver Station, BTS), a radio base station, a radio transceiver, a basic service set (Basic Service Set, BSS), an extended service set (Extended Service Set, ESS), a node B, an evolved node B (eNB), a home Node B, a home evolved node B, a WLAN access point, a WiFi node, a transmitting receiving Point (Transmitting Receiving Point, TRP), or another appropriate term in the field. Provided that the same technical effects are achieved, the base station is not limited to a specific technical term. It is to be noted that only a base station in an NR system is used as an example in the embodiments of the present application, but a specific type of the base station is not limited.

To better understand the solution provided in the present application, the following contents are first described:

Sidelink Transmission

A sidelink terminal can communicate with other terminals on the sidelink, and these terminals are usually cars, road side units (Road side unit, RSU), mobile phones, and the like that support the sidelink technology.

The resource allocation modes of vehicle to X (Vehicle to X, V2X) terminals are divided into:

First mode: A base station can schedule or control the transmission of the terminal on the sidelink through a Uu interface, and allocate corresponding resources for the terminal.

Second mode: The terminal acquires its own transmission resources on the sidelink, and some terminals may further be capable of scheduling the transmission of other V2X terminals on the sidelink.

SL Hybrid Automatic Repeat Request Feedback (Hybrid Automatic Repeat Request Feedback, HARQ Feedback) and Report To improve the reliability and resource utilization of data transmission on the sidelink, a HARQ feedback mechanism is also introduced in the sidelink technology: After a sidelink receiving user receives sidelink data (the sidelink data is transmitted on a physical sidelink feedback channel (Physical Sidelink Feedback Channel, PSFCH), where a physical sidelink shared channel (Physical Sidelink Shared Channel, PSSCH) is scheduled by system control information (System control information, SCI), and the SCI is transmitted on a physical sidelink control channel (Physical Sidelink Control Channel, PSCCH) and/or the PSSCH), a success or failure of the sidelink transmission can be indicated by feeding sidelink HARQ-ACK information back, where the sidelink HARQ-ACK is transmitted on a PSFCH resource. A sidelink sending user can know whether the previous transmission was successful or failed after receiving the sidelink HARQ-ACK information on the sidelink. It is to be noted that a sidelink user can respectively perform receiving or sending in different time or frequency domains.

The transmission of a sidelink data packet may be performed between a control node and a user (where the control node is working on the sidelink at this time), or may be performed on the sidelink between a user and a user. In the latter case, the control node may be incapable of directly knowing whether the transmission of the sidelink data packet is successful, and the user needs to send sidelink HARQ ACK information (such as sidelink acknowledgment (Acknowledgment, ACK)/negative acknowledgment (Negative Acknowledgment)) to the control node through the PUCCH or PUSCH, so that the control node can further determine whether the transmission on the sidelink was successful.

The user who sends the sidelink HARQ-ACK information corresponding to a certain sidelink transmission to the base station is the sending user who sends the sidelink transmission. FIG. 1 shows an example in which a sending user sends sidelink HARQ-ACK information=NACK to a control node and an example in which a receiving user feeds sidelink HARQ-ACK information=NACK back.

When the control node is a base station, the base station needs to allocate PUCCH or PUSCH resources used for reporting sidelink HARQ-ACK information. The PUCCH or PUSCH resources are allocated by indicating the slot (slot) interval PSFCH-PUCCH offset (offset) in radio resource control (Radio Resource Control, RRC) or downlink control information (Downlink Control Information, DCI).

Sidelink Physical Channel Priority

Different packages and services in the sidelink have different priorities, and the priority value is represented by 1 to 8, and a lower priority value indicates a higher priority. Specifically, the priority of data of the sidelink is indicated by the SCI, and the priority of the feedback resource PSFCH corresponding to the data is the same as the priority of the data. There may be a plurality of PSFCH resources in one PSFCH time domain position and these resources may respectively correspond to different data, then the priority of the PSFCH time domain position is determined by the PSFCH resource with the highest priority in these PSFCH resources. The priority value of the sidelink synchronization signal and PBCH block (SL Synchronization Signal and PBCH block, S-SSB) may also be 1 to 8, and the specific priority value may be configured or pre-configured.

The Priority of the PUCCH/PUSCH Used for Reporting Sidelink HARQ-ACK

The base station can indicate that PUCCH/PUSCH resources are used for reporting sidelink HARQ-ACKs to users. One PUCCH/PUSCH resource may be associated with one or more PSFCH time domain positions. Before reporting sidelink HARQ-ACK information on the PUCCH/PUSCH resource, at least some of sidelink HARQ-ACKs carried by the PSFCH resource in the associated PSFCH time domain positions are first sorted and concatenated in a certain order, and the sorted and concatenated sidelink HARQ-ACKs are sent to the base station. That is, one PUCCH/PUSCH resource may correspond to the sidelink HARQ-ACK of one or more pieces of data. In this case, the PUCCH/PUSCH resource is determined by the highest priority in the corresponding sidelink HARQ-ACKs.

Uu Transmission and Uu HARQ-ACK Priority

Corresponding to downlink transmission, the user also feeds HARQ-ACK back. Uu data is divided into enhanced mobile broadband (Enhanced Mobile Broadband, eMBB) and ultra-reliable and low latency communication (Ultra-reliable and Low Latency Communication, URLLC). The user also supports low priority transmission, such as low priority (priority low) or priority index (priority index=0) transmission, and high priority transmission, such as high priority (priority high) or priority index 1 transmission, where the priority of the corresponding HARQ-ACK is the same as the priority of the data, and the priority of the PUCCH/PUSCH carrying the HARQ-ACK is also the same as the priority of the data corresponding to the HARQ-ACK.

The PUCCH/PUSCH is Configured for HARQ-ACK Transmission

The PUCCH can be configured to transmit HARQ-ACK information. When the PUCCH and PUSCH carrying HARQ-ACK information overlap, the user will not transmit the PUCCH, but will multiplex the HARQ-ACK information to be originally transmitted on the PUCCH on the PUSCH, and the data part on the PUSCH is transmitted together.

For Uu, to ensure the performance of high-priority transmission, in the prior art, a high-priority HARQ-ACK cannot be multiplexed and transmitted on a low-priority PUSCH; similarly, a low-priority HARQ-ACK cannot be multiplexed and transmitted on a high-priority PUSCH.

If the PUSCH carrying low-priority or high-priority data and the PUCCH/PUSCH carrying sidelink HARQ-ACK overlap, whether the PUSCH can multiplex the sidelink HARQ-ACK and how the PUSCH multiplexes the sidelink HARQ-ACK are unclear.

This is because: the priority definition of SL HARQ-ACK and the PUCCH/PUSCH carrying the SL HARQ-ACK and the priority definition of the visible down link (down link, DL) HARQ-ACK and the PUCCH/PUSCH carrying the DL HARQ-ACK are two different sets of definitions and cannot be directly compared. For example, in the SL priority, a lower priority value indicates a higher priority, while in the Uu priority, a higher priority value indicates a higher priority. If the sidelink HARQ-ACK is multiplexed on a high-priority PUSCH such as a PUSCH of URLLC, the PUSCH reliability may decrease or the delay may increase. If the sidelink HARQ-ACK is not multiplexed on a high-priority PUSCH such as a PUSCH of URLLC, the sidelink feedback may be lost.

To solve the foregoing problem, referring to FIG. 2, an embodiment of the present application provides a transmission method, applicable to a communication device. The communication device may be a terminal or a network-side device. The method includes:

Step 201: Determine target transmission when a target resource and a first resource at least partially overlap, meet a collision condition, or meet a multiplexing condition, where the target resource is related to an SL, the target resource has or does not have a first Uu priority, the first resource has or does not have a second Uu priority;

the first Uu priority of the target resource includes: a Uu priority of the target resource and/or a Uu priority of at least part of information corresponding to the target resource; and the first SL priority of the target resource includes: an SL priority of the target resource and/or an SL priority of the at least part of information corresponding to the target resource.

First, the following description is provided:

Uu priority refers to the priority system related to Uu, that is, the priority system related to Uu (such as priority index 0 (priority index0) and priority index 1 (priority index1)) is defined as Uu priority; and SL priority refers to the priority system related to SL, that is, the priority system related to SL (such as priority values 1 to 8) is defined as SL priority.

In the present disclosure, the first SL priority of the target resource may be the highest or lowest SL priority in at least part of information corresponding to the target resource, for example, the highest or lowest SL priority in the HARQ-ACKs corresponding to the target resource. In the present disclosure, the first SL priority value of the target resource may be the largest or smallest SL priority value in at least part of information corresponding to the target resource, for example, the largest or smallest SL priority value in the HARQ-ACKs corresponding to the target resource.

In the embodiments of the present application, whether the transmission is performed is determined when the target resource related to the SL and the first resource at least partially overlap, meet the collision condition, or meet the multiplexing condition. The multiplexing condition may be understood as: at least some of conditions that need to be met by at least part of information of one of the target resource and the first resource can be multiplexed and transmitted on the other.

In some implementations, the target transmission is determined based on whether the target resource has a first Uu priority or not, whether the first resource has a second Uu priority or not, the first Uu priority of the target resource, and/or the second Uu priority of the first resource.

For example, the conditions for multiplexing are time domains overlap and a priority requirement is met, then in a case that time domains of the first resource and the target resource overlap, whether multiplexing can be finally performed is further determined based on whether the first Uu priority, the second Uu priority and/or the first SL priority meets the priority requirement.

In the embodiments of the present application, the target resource and the first resource may or may not have a Uu priority. Therefore, whether the target resource and the first resource have a Uu priority, and/or the Uu priority of the two are used as a condition for determining the target transmission. That is, the target transmission is determined by at least one of the following:

whether the target resource has a first Uu priority;

whether the first resource has a second Uu priority;

the first Uu priority of the target resource; or the second Uu priority of the first resource.

In some implementations, a Uu priority is at least one of the following:

a priority indicated by physical layer signaling;

a priority configured by a high layer;

a service priority; or a logic channel priority.

In some implementations, the target transmission is a target uplink transmission.

That the target resource is related to SL means that the target resource may be an SL resource, or a Uu resource used for transmitting SL information. Specifically, in an implementation, the target resource is a Uu resource used for transmitting SL HARQ-ACK, for example, a PUCCH configured to transmit SL HARQ-ACK.

The target resource is a PUCCH that transmits SL information, and the first resource is a PUSCH or PUCCH. When the target resource and the first resource at least partially overlap, meet the collision condition, or meet the multiplexing condition, there may be the following four cases:

Example 1 (Case1): one of the target resource and the first resource has corresponding DCI; and a case in which various target resources and the first resource at least partially overlap, meet the collision condition, or meet the multiplexing condition is shown in Table 1:

TABLE 1

| Combination | The first resource (with corresponding DCI) is at least one of the following | The target resource (without corresponding DCI) is at least one of the following |
|---|---|---|
| First resource PUSCH + target resource SL PUCCH | PUSCH scheduled by Up link (up link, UL) DCI | PUCCH corresponding to an SL scheduled by SL DCI; PUCCH corresponding to transmission on type2 CG when the SL DCI activates the type2 (type2) configured grant (configured grant, CG); SL PUCCH corresponding to retransmission of the transport block (Transport Block, TB) on the CG scheduled by the SL DCI; PUCCH corresponding to Type 1 CG (configured grant) (for example, the PUCCH corresponding to at least one case of: the CG resource is normally used for transmission, the maximum quantity of times of retransmission is reached, the CG resource is dropped (drop), the CG is not actually used, and the like); SL PUCCH corresponding to transmission that type2 CG does not have corresponding DCI after activation of the type2 CG (for example, the PUCCH corresponding to at least one case of: the CG resource is normally used for transmission, the maximum quantity of times of retransmission is reached, the CG resource is dropped, the CG is not actually used, and the like); |
| First resource PUCCH + target resource PUCCH | PUCCH scheduled by DL DCI | PUCCH corresponding to an SL scheduled by SL DCI; PUCCH corresponding to transmission on type2 CG when the SL DCI activates the type2 CG (configured grant); |

TABLE 1-continued

| Combination | The first resource (with corresponding DCI) is at least one of the following | The target resource (without corresponding DCI) is at least one of the following |
|---|---|---|
| | | SL PUCCH corresponding to retransmission of a TB on the CG scheduled by SL DCI; PUCCH corresponding to Type 1 CG (configured grant) (for example, the PUCCH corresponding to at least one case of: the CG resource is normally used for transmission, the maximum quantity of times of retransmission is reached, the CG resource is dropped, the CG is not actually used, and the like); SL PUCCH corresponding to transmission that the type2 CG does not have corresponding DCI after activation of the type2 CG (for example, the PUCCH corresponding to at least one case of: the CG resource is normally used for transmission, the maximum quantity of times of retransmission is reached, the CG resource is dropped, the CG is not actually used, and the like); |

Example 2 (Case2): one of the target resource and the first resource has corresponding DCI; and a case in which various target resources and the first resource at least partially overlap, meet the collision condition, or meet the multiplexing condition is shown in Table 2:

TABLE 2

| Combination | The first resource (without corresponding DCI) is at least one of the following | The target resource (with corresponding DCI) is at least one of the following |
|---|---|---|
| First resource PUSCH + target resource SL PUCCH | CG PUSCH; PUSCH has semi-persistent channel-state Information (Semi-Persistent Channel-State Information, SP-CSI) and does not have a corresponding PDCCH (PUSCH with SP-CSI without corresponding PDCCH) | PUCCH corresponding to an SL scheduled by SL DCI; PUCCH corresponding to transmission on type2 CG when the SL DCI activates the type2 CG (configured grant); SL PUCCH corresponding to retransmission of a TB on the CG scheduled by SL DCI; |
| First resource PUCCH + target resource PUCCH | PUCCH has a scheduling request (Scheduling Request, SR) (PUCCH with SR); PUCCH has HARQ-ACK and does not have a corresponding PDCCH (PUCCH with HARQ-ACK without corresponding PDCCH); PUCCH has semi-persistent or persistent CSI and does not have a corresponding PDCCH (PUCCH with SP/P-CSI without corresponding PDCCH); | PUCCH corresponding to an SL scheduled by SL DCI; PUCCH corresponding to transmission on type2 CG when the SL DCI activates the type2 CG (configured grant); SL PUCCH corresponding to retransmission of a TB on the CG scheduled by SL DCI; |

Example 3 (Case3): both the target resource and the first resource have corresponding DCI; and a case in which various target resources and the first resource at least partially overlap, meet the collision condition, or meet the multiplexing condition is shown in Table 3:

TABLE 3

| Combination | The first resource (with corresponding DCI) is at least one of the following | The target resource (with corresponding DCI) is at least one of the following |
|---|---|---|
| First resource PUSCH + target resource SL PUCCH | PUSCH scheduled by UL DCI; | PUCCH corresponding to an SL scheduled by SL DCI; PUCCH corresponding to transmission on type2 CG when the SL DCI activates the |

TABLE 3-continued

| Combination | The first resource (with corresponding DCI) is at least one of the following | The target resource (with corresponding DCI) is at least one of the following |
| --- | --- | --- |
| First resource PUCCH + target resource PUCCH | PUCCH scheduled by DL DCI | type2 CG (configured grant); SL PUCCH corresponding to retransmission of a TB on the CG scheduled by SL DCI; PUCCH corresponding to an SL scheduled by SL DCI; PUCCH corresponding to transmission on type2 CG when the SL DCI activates the type2 CG (configured grant); SL PUCCH corresponding to retransmission of a TB on the CG scheduled by SL DCI; |

Example 4 (Case4): both the target resource and the first resource have no corresponding DCI; and a case in which various target resources and the first resource at least partially overlap, meet the collision condition, or meet the multiplexing condition is shown in Table 4:

TABLE 4

| Combination | The first resource (without corresponding DCI) is at least one of the following | The target resource (without corresponding DCI) is at least one of the following |
| --- | --- | --- |
| First resource PUSCH + target resource SL PUCCH | CG PUSCH | PUCCH corresponding to Type 1 CG (configured grant) (for example, the PUCCH corresponding to at least one case of: the CG resource is normally used for transmission, the maximum quantity of times of retransmission is reached, the CG resource is dropped, the CG is not actually used, and the like); SL PUCCH corresponding to transmission that Type2 CG does not have corresponding DCI after activation of the type2 CG (for example, the PUCCH corresponding to at least one case of: the CG resource is normally used for transmission, the maximum quantity of times of retransmission is reached, the CG resource is dropped, the CG is not actually used, and the like); |
| First resource PUSCH + target resource SL PUCCH | PUSCH has SP-CSI and does not have a corresponding PDCCH (PUSCH with SP-CSI without corresponding PDCCH) | PUCCH corresponding to Type 1 CG (configured grant) (for example, the PUCCH corresponding to at least one case of: the CG resource is normally used for transmission, the maximum quantity of times of retransmission is reached, the CG resource is dropped, the CG is not actually used, and the like); SL PUCCH corresponding to transmission that Type2 CG does not have corresponding DCI after activation of the type2 CG (for example, the PUCCH corresponding to at least one case of: the CG resource is normally used for transmission, the maximum quantity of times of retransmission is reached, the CG resource is dropped, the CG is not actually used, and the like); |
| First resource PUCCH + target resource PUCCH | PUCCH has (with) SR | PUCCH corresponding to Type 1 CG (configured grant) (for example, the PUCCH corresponding to at least one case of: the CG resource is normally used for transmission, the maximum quantity of times of retransmission is reached, the CG resource is dropped, the CG is not actually used, and the like); SL PUCCH corresponding to transmission that the type2 CG does not have corresponding DCI after activation of the type2 CG (for example, the PUCCH corresponding to at least one case of: the CG resource is normally used for transmission, the maximum quantity of times of retransmission is reached, the CG resource is dropped, the CG is not actually used, and the like); |

TABLE 4-continued

| Combination | The first resource (without corresponding DCI) is at least one of the following | The target resource (without corresponding DCI) is at least one of the following |
|---|---|---|
| First resource PUCCH + target resource PUCCH | PUCCH has HARQ-ACK and does not have a corresponding PDCCH (PUCCH with HARQ-ACK without corresponding PDCCH) | PUCCH corresponding to Type 1 CG (configured grant) (for example, the PUCCH corresponding to at least one case of: the CG resource is normally used for transmission, the maximum quantity of times of retransmission is reached, the CG resource is dropped, the CG is not actually used, and the like); SL PUCCH corresponding to transmission that the type2 CG does not have corresponding DCI after activation of the type2 CG (for example, the PUCCH corresponding to at least one case of: the CG resource is normally used for transmission, the maximum quantity of times of retransmission is reached, the CG resource is dropped, the CG is not actually used, and the like); |
| First resource PUCCH + target resource PUCCH | PUCCH has SP/P-CSI and does not have a corresponding PDCCH (PUCCH with SP/P-CSI without corresponding PDCCH) | PUCCH corresponding to Type 1 CG (configured grant) (for example, the PUCCH corresponding to at least one case of: the CG resource is normally used for transmission, the maximum quantity of times of retransmission is reached, the CG resource is dropped, the CG is not actually used, and the like); SL PUCCH corresponding to transmission that Type2 CG does not have corresponding DCI after activation of the type2 CG (for example, the PUCCH corresponding to at least one case of: the CG resource is normally used for transmission, the maximum quantity of times of retransmission is reached, the CG resource is dropped, the CG is not actually used, and the like); |

The SL DCI in the present disclosure is DCI for scheduling or activating or deactivating SL resources, such as DCI format (format 3-0) or DCI format 3-1, and is, for example, DCI scrambled by SL-configured scheduling (Configured Scheduling, CS)-RNTI or SL-RNTI. The SL PUCCH may be understood as a PUCCH configured to transmit SL information, for example, SL HARQ-ACK. The UL DCI is DCI for scheduling the PUSCH, and the DL DCI is DCI for scheduling the PDSCH.

For at least one of the foregoing case1, case2 and case3 that having corresponding DCI:

base station assurance and/or user expectations: the interval between the target resource and its corresponding DCI is not less than $T_{proc,2}$+delta, and/or the interval between the first resource and its corresponding DCI is not less than $T_{proc,2}$+delta;

delta may be 0 or may not be 0, and may be a positive number or a negative number;

N2 is the processing time, which may correspond to the user's capability;

T is processing time or preparation time, and T may include N2. For example, a value of T may be as follows: $T=(N_2+d_{2,1})(2048+144)\cdot\kappa 2^{-\mu}\cdot T_C$ or $T=\max((N_2+d_{2,1}+d_2)(2048+144)\cdot\kappa 2^{-\mu}\cdot T_C+T_{ext}+T_{switch}, d_{2,2})$;

N2 corresponds to a first specific subcarrier spacing (subcarrier spacing, SCS), and/or T corresponds to a second specific SCS, where the first specific SCS is the minimum or maximum SCS of at least some SCSs of: an SCS of the first resource, an SCS of the control signaling (for example, DCI or RRC) corresponding to the first resource, an SCS of the target resource, an SCS of the first control signaling (for example, indicating the SL DCI of the target resource) corresponding to the target resource, and an SCS of an SL resource (for example, the foregoing SL resource scheduled, activated, or deactivated by the SL DCI) corresponding to the target resource. Specifically, for example, the first specific SCS is the minimum or maximum SCS of: the SCS of the first resource, the SCS of the target resource, and the SCS of the SL resource corresponding to the target resource; in another example, the first specific SCS is the minimum or maximum SCS of: the SCS of the first resource, the SCS of the control signaling corresponding to the first resource, the SCS of the target resource, the SCS of the first control signaling corresponding to the target resource, and the SCS of the SL resource corresponding to the target resource;

or the first specific SCS is the SCS that makes N2 the largest or smallest among configured SCSs;

or the first specific SCS is the SCS that makes N2 the largest or smallest;

where the second specific SCS is the minimum or maximum SCS of at least some of the SCSs of: an SCS of the first resource, an SCS of the control signaling corresponding to the first resource, an SCS of the target resource, an SCS of the first control signaling corresponding to the target resource, and an SCS of an SL resource corresponding to the target resource. Specifically, for example, the second specific SCS is the minimum or maximum SCS of: the SCS of the first resource, the SCS of the target resource, and the SCS of the SL resource corresponding to the target resource; in another example, the second specific SCS is the minimum or maximum SCS of: the SCS of the first resource, the SCS of the control signaling corresponding to the first resource, the SCS of the target resource, the SCS of the first control signaling corresponding to the target resource, and the SCS of the SL resource corresponding to the target resource;

or the second specific SCS is the SCS that makes T the largest or smallest among configured SCSs;

or the second specific SCS is the SCS that makes T the largest or smallest;

the control signaling corresponding to the first resource is control signaling (such as DCI or RRC) for scheduling or indicating or activating the first resource;

the first control signaling corresponding to the target resource may be SL DCI or high-layer signaling for scheduling or configuring or indicating the target resource; and the SL resource corresponding to the target resource may be an SL resource configured or scheduled or activated or deactivated by the foregoing SL DCI or high-layer signaling.

For example, the target resource is a PUCCH configured to transmit SL HARQ-ACK, then the first control signaling corresponding to the target resource is SL DCI or high-layer signaling for configuring or indicating the target resource.

In the present disclosure, the case of finally skipping transmitting the at least part of information of the target resource may alternatively be implemented by that: the base station ensures that there is no overlap or conflict between the target resource and the first resource, or the interval is not less than a preset value, and/or the user does not expect any overlap or conflict between the target resource and the first resource, or the interval is less than the preset value.

That the first resource has a second Uu priority may specifically be interpreted as at least one of the following:

(1) A network side schedules, configures, or indicates the second Uu priority of the first resource.

Specifically, in some implementations, the control signaling (for example, DCI, MAC CE, and/or RRC) for scheduling, configuring, or indicating the first resource carries priority indication information (for example: a priority indicator (priority indicator) and/or a physical priority index (phy-PriorityIndex));

(2) The second Uu priority of the first resource is predefined or pre-configured.

Predefining the second Uu priority of the first resource may be protocol predefinition. For example, if the control signaling (for example, DCI, MAC CE, and/or RRC) for scheduling, configuring, or indicating the first resource does not carry priority indication information (for example: a priority indicator and/or a phy-PriorityIndex)), the second Uu priority of the first resource is predefined to a low priority or priority low or priority index 0.

That the first resource does not have a second Uu priority may specifically be interpreted as at least one of the following:

(1) A network side schedules, configures, or indicates no second Uu priority of the first resource.

Specifically, in some implementations, the control signaling (for example, DCI, MAC CE, and/or RRC) for scheduling, configuring, or indicating the first resource does not carry priority indication information (for example: a priority indicator and/or a phy-PriorityIndex);

(2) No second Uu priority of the first resource is predefined or pre-configured.

In some implementations, the first resource is used for at least one of the following:

(1) URLLC transmission;

(2) transmission greater than a priority threshold, that is, high-priority transmission;

(3) transmission meeting a reliability requirement, that is, high-reliability transmission;

(4) transmission less than a delay threshold and having a packet delay budget (Packet delay budget, PDB) less than a PDB threshold or a remaining PDB (Remaining PDB) less than a remaining PDB threshold; that is, transmission with low delay and a small PDB or a small remaining PDB, where at least one of the above (1) to (4) may be considered as corresponding to the first priority;

(5) eMBB transmission;

(6) transmission less than a priority threshold, that is, low-priority transmission;

(7) transmission not meeting a reliability requirement, that is, low-reliability transmission; or (8) transmission higher than a delay threshold and having a PDB greater than a PDB threshold or a remaining PDB greater than a remaining PDB threshold, that is, transmission with high delay and a large PDB or a large remaining PDB.

At least one of the above (6) to (8) may be considered as corresponding to the second priority.

In some implementations, the method further includes:

determining the first Uu priority of the target resource according to a first SL priority of the target resource based on a mapping relationship, where the mapping relationship may be understood as a correspondence between the first SL priority and the first Uu priority.

In the embodiments of the present application, predefining the Uu priority corresponding to or equivalent to the SL priority for the target resource is that: a mapping relationship between the first Uu priority and the first SL priority of the target resource is established, and the first Uu priority of the target resource can be determined based on the first SL priority of the target resource according to the preset mapping relationship.

Further, the first Uu priority of the target resource is a specific priority; or in a case that the first SL priority of the target resource meets a specific condition, the first Uu priority of the target resource is a specific priority.

In the embodiments of the present application, during determining of the first Uu priority according to the first SL priority, a unified specific priority may be adopted for various first SL priorities, or it is determined that the first Uu priority is a specific priority corresponding to the specific condition for the specific condition met by the first SL priority.

The foregoing specific priority may include one or more priorities, such as high, medium, and low priorities, and priorities 1, 2, 3, 4, and 5. The priority type included in the specific priority is not specifically limited in the embodiments of the present application.

Correspondingly, the foregoing specific condition also includes one or more conditions. Optionally, different specific conditions may respectively correspond to different specific priorities, or may correspond to the same specific priority.

A description is provided below by using a scenario in which the specific priority includes two types of priorities as an example:

Specifically, the specific priority includes: at least one of a first priority and a second priority.

The first priority may be interpreted as a high priority, or priority high, or priority index 1, or URLLC. If the first Uu priority of the target resource and/or the at least part of information corresponding to the target resource is the first priority, it may be understood as that the target resource and/or the at least part of information corresponding to the target resource is of a high priority, or priority high, or priority index 1, or URLLC. For example, the first priority may correspond to a URLLC service. In this case, optionally, the target resource and/or its corresponding information is regarded as URLLC, and the first Uu priority of the target resource is considered to be equivalent to the priority of URLLC.

The second priority may be interpreted as a low priority, or priority low, or priority index 0, or eMBB. If the first Uu priority of the target resource and/or the at least part of information corresponding to the target resource is the second priority, it may be understood as that the target resource and/or the at least part of information corresponding to the target resource is of a low priority, or priority low, or priority index 0, or eMBB. For example, the second priority may correspond to an eMBB service. In this case, optionally, the target resource and/or its corresponding information is regarded as eMBB, and the first Uu priority of the target resource is considered to be equivalent to the priority of eMBB.

The determining the first Uu priority of the target resource according to a first SL priority of the target resource may include:

Example 1 (Case1): Determine the first Uu priority of the target resource as the first priority.

Example 2 (Case2): Determine the first Uu priority of the target resource as the second priority.

Specifically, the specific condition includes at least one of a first condition or a second condition.

The determining the first Uu priority of the target resource according to a first SL priority of the target resource may further include:

Example 3 (Case3): In a case that the first SL priority of the target resource meets a first condition, the first Uu priority of the target resource is a first priority; and/or in a case that the first SL priority of the target resource meets a second condition, the first Uu priority of the target resource is a second priority.

Further, the first condition includes one or more of the following:

the first SL priority of the target resource is higher than or equal to a first preset priority;

a first SL priority value of the target resource is less than or equal to a first preset priority value;

no second preset priority and/or second preset priority value is configured or acquired, where it is to be noted that, if the communication device as the execution entity is a network-side device (such as a base station), in this case, the condition is that no second preset priority and/or second preset priority value is configured; in an optional embodiment, the second priority is the foregoing first priority; in an optional embodiment, the second priority value is the foregoing first priority value; and if the communication device as the execution entity is a terminal, in this case, the condition is that no second preset priority and/or second preset priority value is acquired; for example, no second preset priority and/or second preset priority value is configured by the base station or predefined in a protocol; and the second condition is not met.

The second condition includes one or more of the following:

the first SL priority of the target resource is higher than or equal to a third preset priority;

a first SL priority value of the target resource is less than or equal to a third preset priority value;

no fourth preset priority and/or fourth preset priority value is configured or acquired, where in an optional embodiment, the fourth priority is the foregoing first priority, second priority, and/or third priority, and in an optional embodiment, the fourth priority value is the foregoing first priority value, second priority value, and/or third priority value; and the first SL priority of the target resource is lower than or equal to a fifth preset priority;

a first SL priority value of the target resource is greater than or equal to a fifth preset priority value, where in an optional embodiment, the fifth priority is the foregoing first priority, and in an optional embodiment, the fifth priority value is the foregoing first priority value; and the first condition is not met.

It is to be noted that, at least some of the foregoing first preset priority to fifth preset priority may correspond to the priorities corresponding to sl-priority threshold (PriorityThreshold) ULURLLC and/or sl-PriorityThreshold, and at least some of the foregoing first preset priority value to fifth preset priority value may correspond to the priority values corresponding to the SL priority threshold sl-PriorityThresholdU-LURLLLC of UL URLLC and/or sl-PriorityThreshold;

For example:

when the first SL priority of the target resource meets the first condition, an embodiment in which the first Uu priority of the target resource is the first priority is that: when the first SL priority value of the target resource is equal to or less than the priority value corresponding to sl-PriorityThreshold or sl-PriorityThresholdU-LURLLC, the target resource is the first priority; and when the first SL priority of the target resource meets the second condition, an embodiment in which the first Uu priority of the target resource is the second priority is that: when the first SL priority value of the target resource is equal to or greater than the priority value corresponding to sl-PriorityThreshold or sl-PriorityThresholdULURLLC, the target resource is the second priority, where In this embodiment, the first SL priority of the target resource may be the smallest priority value in the SL HARQ-ACK corresponding to the target resource.

It is to be noted that, the foregoing first preset priority (value) to fifth preset priority (value) may be the same or different, which is not specifically limited in the embodiments of the present application.

Based on the same principle, if the specific priority includes three types of priorities: a high priority, a medium priority, and a low priority, the determining the first Uu priority according to the first SL priority may include:

(1) the first Uu priority is a high priority;

(2) the first Uu priority is a medium priority;

(3) the first Uu priority is a low priority;

(4) when the first SL priority meets the first condition, the first Uu priority is a high priority;

(5) when the first SL priority meets the second condition, the first Uu priority is a medium priority; and (6) when the first SL priority meets a third condition (the specific content of the third condition may be set with reference to the first condition and the second condition), the first Uu priority is a low priority.

For specific priorities of other priority type quantities, the manner of determining the first Uu priority according to the first SL priority may be set based on the same principle, and details are not described herein again.

In some implementations, the first Uu priority of target resource includes one or more of the following:

(1) A first specific Uu priority in the Uu priority of the at least part of information corresponding to the target resource.

The foregoing first specific Uu priority may be the highest or lowest Uu priority among the Uu priorities of the information corresponding to the target resource.

Preferably, the at least part of information corresponding to the target resource is all information corresponding to the target resource, for example, all HARQ-ACK bits corresponding to the target resource.

For example: the target resource corresponds to 3 HARQ-ACK bits, and the corresponding Uu priorities are high, low, and high respectively, then the Uu priority of the target resource is high or low.

(2) A Uu priority corresponding to a specific SL priority in an SL priority of the at least part of information corresponding to the target resource.

The foregoing specific SL priority may be the Uu priority corresponding to the highest or lowest SL priority among the SL priorities of the information corresponding to the target resource.

Preferably, the at least part of information corresponding to the target resource is all information corresponding to the target resource, for example, all HARQ-ACK bits corresponding to the target resource.

For example: the target resource corresponds to 3 HARQ-ACK bits, the corresponding SL priorities are the SL priorities corresponding to the priority values 1, 1, and 8 respectively, and the Uu priority corresponding to the SL priority value 1 is high, then the Uu priority of the target resource is high.

(3) The Uu priority of the at least part of information corresponding to the target resource.

Preferably, the at least part of information corresponding to the target resource is all information corresponding to the target resource, for example, all HARQ-ACK bits corresponding to the target resource.

For example: the target resource corresponds to 3 HARQ-ACK bits, and the corresponding Uu priorities are high/low/high respectively, then the Uu priority of the target resource includes high and low.

Similarly, a first Uu priority value of the target resource includes one or more of the following:

(1) A first specific Uu priority value in a Uu priority value of the at least part of information corresponding to the target resource.

The foregoing first specific Uu priority value may be the highest or lowest Uu priority value among the Uu priority values of the information corresponding to the target resource.

Preferably, the at least part of information corresponding to the target resource is all information corresponding to the target resource.

For example: the target resource corresponds to 3 HARQ-ACK bits, and the corresponding Uu priority values are 1, 1, and 0 respectively, then the Uu priority value of the target resource is 1 or 0.

(2) A Uu priority value corresponding to a specific SL priority value in an SL priority value of the at least part of information corresponding to the target resource.

The foregoing specific SL priority value may be the Uu priority value corresponding to the highest or lowest SL priority value among the SL priority values of the information corresponding to the target resource.

Preferably, the at least part of information corresponding to the target resource is all information corresponding to the target resource.

For example: the target resource corresponds to 3 HARQ-ACK bits, the corresponding SL priority values are 1, 1, and 8, and the Uu priority value corresponding to 1 is 1, then the Uu priority value of the target resource is 1.

(3) A Uu priority value of the at least part of information corresponding to the target resource.

Preferably, the at least part of information corresponding to the target resource is all information corresponding to the target resource.

For example: the target resource corresponds to 3 HARQ-ACK bits, and the corresponding Uu priority values are 1, 1, and 0 respectively, then the Uu priority value of the target resource includes 1 and 0.

It is to be noted that, In the embodiments of the present application, the correspondence between the priority value and the priority can be in a positive order or a reverse order, where the positive order means that a greater priority value indicates a higher priority; and the reverse order means that a greater priority value indicates a lower priority; and the foregoing example is described in a case of the reverse order. It may be understood that it is also applicable to a case of the positive order. When corresponding to the positive order, a certain priority value being greater than another priority value in the description of the present disclosure is correspondingly replaced with being less than another priority value, and/or if it is written that a certain priority value is less than another priority value, the written content is correspondingly replaced with being greater than another priority value.

In some implementations, the target resource includes one or more of the following:

(1) A resource on which a target object is located, for example, an SL resource or a Uu resource, where the target object includes an SL channel, an SL signal, SL signaling, SL information, and/or an SL message.

For example: the SL information is SL HARQ-ACK.

(2) A Uu channel, signal, and/or resource used for transmitting or indicating target content, where the target content includes the SL signal, the SL signaling, the SL information, and/or the SL message.

The foregoing transmission includes: forwarding, bearing, carrying, reporting, and the like.

For example: the target resource is a PUCCH and/or PUSCH carrying SL HARQ-ACK, or a PUCCH carrying SL SR, or a PUCCH and/or PUSCH carrying SL channel-state information (Channel-State Information, CSI).

(3) SL HARQ-ACK.

(4) An uplink resource carrying the SL HARQ-ACK (PUCCH and/or PUSCH).

In some implementations, the information corresponding to the target resource may be at least one of the following:

(1) information that the target resource intends to, expects to, and may forward, bear, carry and/or report; or (2) information related to the target resource.

In some implementations, that the target resource does not have a first Uu priority may specifically be interpreted as at least one of the following:

(1) A network side schedules, configures, or indicates no first Uu priority of the target resource.

Specifically, in some implementations, the control signaling (for example, DCI, MAC CE, and/or RRC) for scheduling, configuring, or indicating the first resource does not carry priority indication information (for example: a priority indicator and/or a phy-PriorityIndex);

(2) No first Uu priority of the target resource is predefined or pre-configured.

The following describes the manner of determining the target transmission under various conditions. In some implementations, after the target transmission is determined, the target transmission is performed on the first resource, and the following descriptions are all provided by using an example in which the target transmission is performed on the first resource:

1. The target resource has the first Uu priority, the first resource has the second Uu priority, and the determining target transmission includes at least one of the following:

(1) In a case that the first Uu priority of the target resource is the same as the second Uu priority of the first resource or a difference value therebetween is less than a first preset difference value, the at least part of information corresponding to the target resource is transmitted on the first resource, that is, the transmission can be multiplexed only when the Uu priorities are the same.

Specifically, in a case that the first Uu priority of the target resource is the same as the second Uu priority of the first resource and is a first priority, the at least part of information corresponding to the target resource is transmitted on the first resource.

Optionally, this case may be matched with Case1 in the determining the first Uu priority according to the first SL priority described above. This case may alternatively be matched with Case2 and Case3 in the determining the first Uu priority according to the first SL priority.

Specifically, in a case that the first Uu priority of the target resource is the same as the second Uu priority of the first resource and is a second priority, the at least part of information corresponding to the target resource is transmitted on the first resource.

Optionally, this case may be matched with Case2 in the determining the first Uu priority according to the first SL priority described above. This case may alternatively be matched with Case1 and Case3 in the determining the first Uu priority according to the first SL priority.

(2) In a case that the first Uu priority of the target resource is different from the second Uu priority of the first resource or a difference value therebetween is greater than a second preset difference value, the at least part of information corresponding to the target resource is not transmitted on the first resource, that is, the transmission cannot be multiplexed when the Uu priorities are different.

Specifically, in a case that the first Uu priority of the target resource is a first priority and the second Uu priority of the first resource and is a second priority, the at least part of information corresponding to the target resource is not transmitted on the first resource.

This case may be matched with Case1 in the determining the first Uu priority according to the first SL priority described above. This case may alternatively be matched with Case2 and Case3 in the determining the first Uu priority according to the first SL priority.

Specifically, in a case that the first Uu priority of the target resource is a second priority and the second Uu priority of the first resource and is a first priority, the at least part of information corresponding to the target resource is not transmitted on the first resource.

This case may be matched with Case2 in the determining the first Uu priority according to the first SL priority described above. This case may alternatively be matched with Case1 and Case3 in the determining the first Uu priority according to the first SL priority.

Further, in a case that the first Uu priority of the target resource is different from the second Uu priority of the first resource, the target resource or the first resource is transmitted according to a Uu priority.

Specifically, when the first Uu priority of the target resource is different from the second Uu priority of the first resource, the resource with the higher Uu priority is transmitted. For example: when the Uu priority corresponding to the target resource is a high priority, or priority high, or priority index 1, and the Uu priority corresponding to the first resource is a low priority, or priority low, or priority index 0, the target resource is transmitted; and when the Uu priority corresponding to the target resource is a low priority, or priority low, or priority index 0, and the Uu priority corresponding to the first resource is a high priority, or priority high, or priority index 1, the first resource is transmitted.

It is to be noted that, while the resource with the higher Uu priority is being transmitted, the resource with the lower Uu priority is dropped.

2. The target resource has the first Uu priority, and the first resource has or does not have the second Uu priority, that is, in this case, regardless of whether the first resource has the second Uu priority or not, the determining target transmission includes at least one of the following:

(1) transmitting the at least part of information corresponding to the target resource on the first resource in a case that the first Uu priority of the target resource is higher than or equal to a first specific priority, and/or lower than or equal to a second specific priority; or (2) skipping transmitting the at least part of information corresponding to the target resource on the first resource in a case that the first Uu priority of the target resource is higher than or equal to a third specific priority, and/or lower than or equal to a fourth specific priority.

That is, when the Uu priority of the target resource does not meet the requirement, the transmission cannot be multiplexed.

Optionally, at least some of the foregoing first specific priority, second specific priority, third specific priority, and fourth specific priority may be priorities corresponding to sl-PriorityThresholdULURLLC and/or sl-PriorityThreshold, for example, Uu priorities corresponding to sl-PriorityThresholdULURLLC and/or sl-PriorityThreshold.

In the present disclosure, the priorities corresponding to sl-PriorityThresholdULURLLC and/or sl-PriorityThreshold are the Uu priorities or SL priorities corresponding to sl-PriorityThresholdULURLLC and/or sl-PriorityThreshold.

In an embodiment, sl-PriorityThresholdULURLLC and/or sl-PriorityThreshold is a priority value, and the SL priorities corresponding to sl-PriorityThresholdULURLLC and/or sl-PriorityThreshold are the SL priorities corresponding to the value. In an embodiment, the Uu priorities corresponding to sl-PriorityThresholdULURLLC and/or sl-PriorityThreshold may be interpreted as the Uu priorities corresponding to the SL priorities corresponding to sl-PriorityThresholdULURLLC and/or sl-PriorityThreshold.

3. The target resource has or does not have the first Uu priority, and the first resource has the second Uu priority, that is, in this case, regardless of whether the target resource has the first Uu priority or not, and regardless of whether the Uu priority of the target resource is defined or not, the case may be matched with case1/2/3 in the determining the first Uu priority according to the first SL priority described above, and may also work when the Uu priority of the target resource is not defined, and the determining target transmission includes at least one of the following:

(1) skipping transmitting the at least part of information corresponding to the target resource on the first resource in a case that the second Uu priority of the first resource is a first priority; or (2) transmitting the at least part of information corresponding to the target resource on the first resource in a case that the second Uu priority of the first resource is a second priority, where the first priority is higher than the second priority.

That is, the transmission can be multiplexed only when the first resource and/or its corresponding information is of a low priority or priority low or priority index 0 or eMBB.

4. The target resource has or does not have the first Uu priority, and the first resource has the second Uu priority, that is, in this case, regardless of whether the target resource has the first Uu priority or not, and regardless of whether the Uu priority of the target resource is defined or not, the case may be matched with case1/2/3 in the determining the first Uu priority according to the first SL priority described above, and may also work when the Uu priority of the target resource is not defined, and the determining target transmission includes at least one of the following:

(1) transmitting the at least part of information corresponding to the target resource on the first resource in a case that the second Uu priority of the first resource is a first priority; or (2) skipping transmitting the at least part of information corresponding to the target resource on the first resource in a case that the second Uu priority of the first resource is a second priority, where the first priority is higher than the second priority.

That is, the transmission can be multiplexed only when the first resource and/or its corresponding information is of a high priority or priority high or priority index 1 or URLLC.

5. The determining target transmission includes at least one of the following:

(1) transmitting the at least part of information corresponding to the target resource on the first resource;

(2) transmitting the at least part of information corresponding to the target resource on the first resource in a case that a first SL priority of the target resource is higher than or equal to a fifth specific priority, and/or lower than or equal to a sixth specific priority; or (3) transmitting the at least part of information corresponding to the target resource on the first resource in a case that a first SL priority of the target resource is higher than or equal to a seventh specific priority, and/or lower than or equal to an eighth specific priority.

Optionally, at least some of the foregoing fifth specific priority to eighth specific priority may be SL priorities corresponding to sl-PriorityThresholdULURLLC and/or sl-PriorityThreshold.

For example: if the first SL priority of the target resource is equal to or higher than the SL priority corresponding to sl-PriorityThresholdURLLC or sl-PriorityThreshold, the at least part of information corresponding to the target resource may be transmitted.

Further, when the first resource is the first priority, if the first SL priority of the target resource is equal to or higher than the SL priority corresponding to sl-PriorityThresholdU-LURLLC or sl-PriorityThreshold, the at least part of information corresponding to the target resource may be transmitted.

For example: if the first SL priority of the target resource is equal to or lower than the SL priority corresponding to sl-PriorityThreshold or sl-PriorityThresholdURLLC, the at least part of information corresponding to the target resource may be transmitted.

Further, when the first resource is the second priority, if the first SL priority of the target resource is equal to or lower than the SL priority corresponding to sl-PriorityThreshold or sl-PriorityThresholdURLLC, the at least part of information corresponding to the target resource may be transmitted.

Example 1. The target resource is a PUCCH configured to transmit SL HARQ-ACK, and the first resource is a PUSCH; and the example includes at least one of the following:

i. Only when the SL priority value of the SL HARQ-ACK is greater than or equal to the priority value corresponding to sl-PriorityThreshold or sl-PriorityThresholdU-LURLLC, the SL HARQ-ACK will be multiplexed to the PUSCH. Alternatively, only when the SL priority of the SL HARQ-ACK is equal to or lower than the priority corresponding to sl-PriorityThreshold or sl-PriorityThresholdULURLLC, the SL HARQ-ACK will be multiplexed to the PUSCH.

ii. Only when the SL priority value of the SL HARQ-ACK is less than or equal to the priority value corresponding to sl-PriorityThresholdULURLLC or sl-PriorityThreshold, the SL HARQ-ACK will be multiplexed to the PUSCH. Alternatively, only when the SL priority of the SL HARQ-ACK is equal to or higher than the priority corresponding to sl-PriorityThresholdULURLLC or sl-PriorityThreshold, the SL HARQ-ACK will be multiplexed to the PUSCH.

Example 2 i. The first resource is of a low priority, or priority low, or priority index 0, or eMBB, only when the SL priority value of the SL HARQ-ACK is greater than or equal to the priority value corresponding to sl-PriorityThreshold, the SL HARQ-ACK will be multiplexed to the PUSCH. Alternatively, only when the SL priority of the SL HARQ-ACK is equal to or lower than the priority corresponding to sl-PriorityThreshold, the SL HARQ-ACK will be multiplexed to the PUSCH.

ii. The first resource is of a low priority, or priority low, or priority index 0, or eMBB, only when the SL priority value of the SL HARQ-ACK is greater than or equal to the priority value corresponding to sl-PriorityThreshold ULURLLC, the SL HARQ-ACK will be multiplexed to the PUSCH. Alternatively, only when the SL priority of the SL HARQ-ACK is equal to or lower than the priority corresponding to sl-PriorityThresholdU-LURLLC, the SL HARQ-ACK will be multiplexed to the PUSCH.

iii. When the first resource is of a high priority, or priority high, or priority index 1, or URLLC, only when the SL priority value of the SL HARQ-ACK is less than or equal to the priority value corresponding to sl-PriorityThresholdULURLLC, the SL HARQ-ACK will be multiplexed to the PUSCH. Alternatively, only when the SL priority of the SL HARQ-ACK is equal to or higher than the priority corresponding to sl-PriorityTh-resholdULURLLC, the SL HARQ-ACK will be multiplexed to the PUSCH.

v. When the first resource is of a high priority, or priority high, or priority index 1, or URLLC, only when the SL priority value of the SL HARQ-ACK is less than or equal to the priority value corresponding to sl-PriorityThreshold, the SL HARQ-ACK will be multiplexed to the PUSCH. Alternatively, only when the SL priority of the SL HARQ-ACK is equal to or higher than the priority corresponding to sl-PriorityThreshold, the SL HARQ-ACK will be multiplexed to the PUSCH.

It is to be noted that, the at least part of information herein and the at least part of information mentioned above in the determining target transmission based on a related priority may refer to different objects or the same object.

6. When the first resource has the second Uu priority, and/or the first control signaling carries priority indication information (such as a priority indicator and/or phy-PriorityIndex), the at least part of information corresponding to the target resource is transmitted on the first resource, where the first control signaling is used for scheduling, configuring, or indicating the first resource, such as DCI, MAC CE, and/or RRC.

7. When the first resource does not have the second Uu priority, and/or the first control signaling does not carry priority indication information (such as a priority indicator and/or phy-PriorityIndex), the at least part of information corresponding to the target resource is transmitted on the first resource, where the first control signaling is used for scheduling, configuring, or indicating the first resource, such as DCI, MAC CE, and/or RRC.

Further, in a case of transmitting the at least part of information corresponding to the target resource on the first resource, the at least part of information includes at least one of the following:

(a) all information corresponding to the target resource, that is, the all information corresponding to the target resource may be transmitted on the first resource; or (b) information equal to the second Uu priority of the first resource;

that is, the information equal to the Uu priority corresponding to the first resource in the information corresponding to the target resource can be transmitted on the first resource:

for example, if the first resource is of a high priority or priority high or priority index 1 or URLLC, the information corresponding to a high priority or priority high or priority index 1 or URLLC in the information corresponding to the target resource may be transmitted; and in another example, if the first resource is of a low priority or priority low or priority index 0 or eMBB, the information corresponding to a low priority or priority low or priority index 0 or eMBB in the information corresponding to the target resource may be transmitted;

(c) information not lower than the second Uu priority of the first resource;

for example, if the first resource is of a high priority or priority high or priority index 1 or URLLC, the information corresponding to a high priority or priority high or priority index 1 or URLLC in the information corresponding to the target resource may be transmitted; and in another example, if the first resource is of a low priority or priority low or priority index 0 or eMBB, the information corresponding to a low priority or priority low or priority index 0 or eMBB and the information corresponding to a high priority or priority high or priority index 1 or URLLC in the information corresponding to the target resource may be transmitted;

(d) information not higher than the second Uu priority of the first resource;

For example, if the first resource is of a high priority or priority high or priority index 1 or URLLC, the information corresponding to a low priority or priority low or priority index 0 or eMBB and the information corresponding to a high priority or priority high or priority index 1 or URLLC in the information corresponding to the target resource may be transmitted;

in another example, if the first resource is of a low priority or priority low or priority index 0 or eMBB, the information corresponding to a low priority or priority low or priority index 0 or eMBB in the information corresponding to the target resource may be transmitted;

(e) information corresponding to a first SL priority higher than a sixth preset priority;

(f) information corresponding to a first SL priority value less than a sixth preset priority value;

(g) information corresponding to a first Uu priority higher than a seventh preset priority;

(h) information corresponding to a first Uu priority value less than a seventh preset priority value;

(i) information corresponding to a first SL priority lower than an eighth preset priority;

(j) information corresponding to a first SL priority value higher than an eighth preset priority value;

(k) information corresponding to a first Uu priority lower than a ninth preset priority; or (l) information corresponding to a first Uu priority value higher than a ninth preset priority value.

the foregoing sixth preset priority (value) to ninth preset priority (value) may be the same or different. Optionally, at least some of the foregoing sixth preset priority to ninth preset priority may correspond to the priority corresponding to sl-PriorityThresholdULURLLC and/or the priority corresponding to sl-PriorityThreshold. For example, at least some of the foregoing sixth preset priority to ninth preset priority may correspond to the SL priority corresponding to sl-PriorityThresholdU-LURLLC, the SL priority corresponding to sl-PriorityThreshold, the Uu priority corresponding to sl-PriorityThresholdULURLLC, and/or the Uu priority corresponding to sl-PriorityThreshold.

Further, in a case of skipping transmitting the at least part of information corresponding to the target resource on the first resource, the at least part of information includes at least one of the following:

(a) all information corresponding to the target resource, that is, the all information corresponding to the target resource cannot be transmitted on the first resource;

(b) information not equal to the second Uu priority of the first resource, that is, information not equal to the Uu priority corresponding to the first resource in the information corresponding to the target resource cannot be transmitted on the first resource;

for example, if the first resource is of a high priority or priority high or priority index 1 or URLLC, the information corresponding to a low priority or priority low or priority index 0 or eMBB in the information corresponding to the target resource cannot be transmitted; and in another example, if the first resource is of a low priority or priority low or priority index 0 or eMBB, the information corresponding to a high priority or priority high or priority index 1 or URLLC in the information corresponding to the target resource cannot be transmitted;

(c) information not lower than the second Uu priority of the first resource;

for example, if the first resource is of a high priority or priority high or priority index 1 or URLLC, the information corresponding to a high priority or priority high or priority index 1 or URLLC in the information corresponding to the target resource cannot be transmitted; and in another example, if the first resource is of a low priority or priority low or priority index 0 or eMBB, the information corresponding to a low priority or priority low or priority index 0 or eMBB and the information corresponding to a high priority or priority high or priority index 1 or URLLC in the information corresponding to the target resource cannot be transmitted;

(d) information not higher than the second Uu priority of the first resource;

For example, if the first resource is of a high priority or priority high or priority index 1 or URLLC, the information corresponding to a low priority or priority low or priority index 0 or eMBB and the information corresponding to a high priority or priority high or priority index 1 or URLLC in the information corresponding to the target resource cannot be transmitted;

in another example, if the first resource is of a low priority or priority low or priority index 0 or eMBB, the information corresponding to a low priority or priority low or priority index 0 or eMBB in the information corresponding to the target resource cannot be transmitted;

(e) information corresponding to a first SL priority lower than a tenth preset priority;

(f) information corresponding to a first SL priority value higher than a tenth preset priority value;

(g) information corresponding to a first Uu priority lower than an eleventh preset priority;

(h) information corresponding to a first Uu priority value higher than an eleventh preset priority value;

(i) information corresponding to a first SL priority higher than a twelfth preset priority;

(j) information corresponding to a first SL priority value less than a twelfth preset priority value;

(k) information corresponding to a first Uu priority higher than a thirteenth preset priority; or (l) information corresponding to a first Uu priority value less than a thirteenth preset priority value.

the foregoing tenth preset priority (value) to thirteenth preset priority (value) may be the same or different. Optionally, at least some of the foregoing tenth preset priority to thirteenth preset priority may correspond to the priority corresponding to sl-PriorityThresholdULURLLC and/or the priority corresponding to sl-PriorityThreshold. Optionally, at least some of the foregoing tenth preset priority to thirteenth preset priority may correspond to the SL priority corresponding to sl-PriorityThresholdULURLLC, the SL priority corresponding to sl-PriorityThreshold, the Uu priority corresponding to sl-PriorityThresholdULURLLC, and/or the Uu priority corresponding to sl-PriorityThreshold.

If the foregoing transmitted information is part of the all information corresponding to the target resource, or not the all information corresponding to the target resource, it may be understood that information other than the at least part of information is dropped (drop).

In some implementations, the target resource includes a plurality of Uu priorities, and/or the information corresponding to the target resource respectively corresponds to different Uu priorities, in a case that a plurality of first resources and the target resource overlap, meet the collision condition, or meet the multiplexing condition, the method further includes:

determining the target transmission according to the second Uu priority of each of the plurality of first resources.

Specifically, according to the methods in the foregoing cases, each first resource is considered respectively to determine the target transmission.

For example, information corresponding to a certain Uu priority is multiplexed on the first resource corresponding to the same Uu priority.

Specifically, for example: the target resource PUCCH corresponds to two sidelink HARQ-ACK bits, the corresponding Uu priorities are high and low respectively, and the target resource and two PUSCHs with a high Uu priority and a low Uu priority respectively overlap, then the sidelink HARQ-ACK bit corresponding to the high Uu priority is multiplexed on the PUSCH with the high Uu priority, and the sidelink HARQ-ACK bit corresponding to the low Uu priority is multiplexed on the PUSCH with the low Uu priority.

In some implementations, in a case that a plurality of first resources and the target resource overlap, meet the collision condition, or meet the multiplexing condition, the method further includes:

(1) determining the target transmission according to the second Uu priority of each of the plurality of first resources in a preset order, where the preset order includes: a time domain order of the plurality of first resources, a frequency domain order of the plurality of first resources, an identifier order of the plurality of first resources, and/or a second Uu priority order of the plurality of first resources; for example, a time domain resource order, which may specifically be the order of the start point of the time domain and the order of the end point of the time domain; and the frequency domain position high and low order.

(2) determining the target transmission according to a second specific Uu priority in the second Uu priority.

For example: the first resources with the highest Uu priority, the lowest Uu priority, greater than a threshold 1 or less than a threshold 2 in the plurality of first resources are considered to determine the target transmission.

In some implementations, a priority of the target transmission is any one of the following:

the second Uu priority of the first resource;

the first Uu priority of the target resource; or a first SL priority of the target resource.

Further, in a case that the priority of the target transmission is the second Uu priority of the first resource, the second Uu priority of the first resource is higher than the first Uu priority or the first SL priority of the target resource; or in a case that the priority of the target transmission is the first Uu priority or the first SL priority of the target resource, the first Uu priority or the first SL priority of the target resource is higher than the second Uu priority of the first resource.

Similarly, in some implementations, a priority value of the target transmission is any one of the following:

a second Uu priority value of the first resource;

a first Uu priority value of the target resource; or a first SL priority value of the target resource.

Further, in a case that the priority value of the target transmission is the second Uu priority value of the first resource, the second Uu priority value of the first resource is less than the first Uu priority value or the first SL priority value of the target resource; or in a case that the priority value of the target transmission is the first Uu priority value or the first SL priority value of the target resource, the first Uu priority value or the first SL priority value of the target resource is less than the second Uu priority value of the first resource.

In some implementations, the first resource is a PUCCH and/or PUSCH resource, for example, a PUCCH and/or PUSCH with a Uu priority, for example, a PUCCH and/or PUSCH that can correspond to information having a corresponding Uu priority. The first resource may alternatively be other uplink signals, such as uplink reference signals, which are specifically an SRS and a positioning RS (Positioning RS).

Referring to FIG. 3, an embodiment of the present application provides a priority definition method, applicable to a communication device. The communication device may be a terminal or a network-side device. The method includes:

Step 301: Configure or acquire a mapping relationship between a first Uu priority and a first SL priority of a target resource.

It is to be noted that, if the communication device as the execution entity is a network-side device (for example, a base station), this step is to configure the mapping relationship between the first Uu priority and the first SL priority of the target resource; and if the communication device as the execution entity is a terminal, this step is to acquire the mapping relationship between the first Uu priority and the first SL priority of the target resource; for example, the mapping relationship may be configured by the base station, predefined in a protocol, pre-configured, or user-defined.

Step 302: Determine the first Uu priority of the target resource according to the mapping relationship.

The mapping relationship may be understood as a correspondence between the first SL priority and the first Uu priority.

It is to be noted that, the mapping relationship may include a case that different first SL priorities correspond to different first Uu priorities respectively, or may include a case that first Uu priorities are all defined as the same priority regardless of the level of the first SL priority of the target resource, for example, a case that the first Uu priorities are all defined as a first priority or a second priority.

In the embodiments of the present application, the target resource is related to an SL, and being related to the SL means that the target resource may be an SL resource, or a Uu resource used for transmitting SL-related information.

the first Uu priority of the target resource includes: a Uu priority of the target resource and/or a Uu priority of at least part of information corresponding to the target resource; and the first SL priority of the target resource includes: an SL priority of the target resource and/or an SL priority of the at least part of information corresponding to the target resource.

In some implementations, the mapping relationship meets that:

the first Uu priority of the target resource is a specific priority;

or in a case that the first SL priority of the target resource meets a specific condition, the first Uu priority of the target resource is a specific priority corresponding to the specific condition.

In the embodiments of the present application, predefining the Uu priority corresponding to or equivalent to the SL priority for the target resource is that: a mapping relationship between the first Uu priority and the first SL priority of the target resource is established, and the first Uu priority of the target resource can be determined based on the first SL priority of the target resource according to the preset mapping relationship.

Further, the first Uu priority of the target resource is a specific priority; or in a case that the first SL priority of the target resource meets a specific condition, the first Uu priority of the target resource is a specific priority.

In the embodiments of the present application, during determining of the first Uu priority according to the first SL priority, a unified specific priority may be adopted for various first SL priorities, or it is determined that the first Uu priority is a specific priority corresponding to the specific condition for the specific condition met by the first SL priority.

The foregoing specific priority may include one or more priorities, such as high, medium, and low priorities, and priorities 1, 2, 3, 4, and 5. The priority type included in the specific priority is not specifically limited in the embodiments of the present application.

Correspondingly, the foregoing specific condition also includes one or more conditions, that is, different specific conditions respectively correspond to different specific priorities.

A description is provided below by using a scenario in which the specific priority includes two types of priorities as an example:

Specifically, the specific priority includes: at least one of a first priority and a second priority.

The first priority may be interpreted as a high priority, or priority high, or priority index 1, or URLLC. If the first Uu priority of the target resource and/or the at least part of information corresponding to the target resource is the first priority, it may be understood as that the target resource and/or the at least part of information corresponding to the target resource is of a high priority, or priority high, or priority index 1, or URLLC. For example, the first priority may correspond to a URLLC service. In this case, optionally, the target resource and/or its corresponding information is regarded as URLLC, and the first Uu priority of the target resource is considered to be equivalent to the priority of URLLC.

The second priority may be interpreted as a low priority, or priority low, or priority index 0, or eMBB. If the first Uu priority of the target resource and/or the at least part of information corresponding to the target resource is the second priority, it may be understood as that the target resource and/or the at least part of information corresponding to the target resource is of a low priority or priority low or priority index 0, or is eMBB. For example, the second priority may correspond to an eMBB service. In this case, optionally, the target resource and/or its corresponding information is regarded as eMBB, and the first Uu priority of the target resource is considered to be equivalent to the priority of eMBB.

The determining the first Uu priority of the target resource according to a first SL priority of the target resource may include:

Case1: Determine the first Uu priority of the target resource as the first priority.

Case2: Determine the first Uu priority of the target resource as the second priority.

Specifically, the specific condition includes at least one of a first condition or a second condition.

The determining the first Uu priority of the target resource according to a first SL priority of the target resource may further include:

Case3: When the first SL priority of the target resource meets the first condition, the first Uu priority of the target resource is the first priority; and/or when the first SL priority of the target resource meets the second condition, the first Uu priority of the target resource is the second priority.

Further, the first condition includes one or more of the following:

the first SL priority of the target resource is higher than or equal to a first preset priority;

a first SL priority value of the target resource is less than or equal to a first preset priority value;

no second preset priority and/or second preset priority value is configured or acquired; and the second condition is not met.

The second condition includes one or more of the following:

the first SL priority of the target resource is higher than or equal to a third preset priority;

a first SL priority value of the target resource is less than or equal to a third preset priority value;

no fourth preset priority and/or fourth preset priority value is configured or acquired;

the first SL priority of the target resource is lower than or equal to a fifth preset priority;

a first SL priority value of the target resource is greater than or equal to a fifth preset priority value, where in an optional embodiment, the fifth priority is the foregoing first priority; and the first condition is not met.

It is to be noted that, at least some of the foregoing first preset priority to fifth preset priority may correspond to the priorities corresponding to sl-PriorityThresholdULURLLC and/or sl-PriorityThreshold, and at least some of the foregoing first preset priority value to fifth preset priority value may correspond to the priority values corresponding to the sl-PriorityThresholdULURLLC and/or sl-PriorityThreshold;

It is to be noted that, the foregoing first preset priority (value) to fifth preset priority (value) may be the same or different, which is not specifically limited in the embodiments of the present application.

Based on the same principle, if the specific priority includes three types of priorities: a high priority, a medium priority, and a low priority, the determining the first Uu priority according to the first SL priority may include:

(1) the first Uu priority is a high priority;

(2) the first Uu priority is a medium priority;

(3) the first Uu priority is a low priority;

(4) when the first SL priority meets the first condition, the first Uu priority is a high priority;

(5) when the first SL priority meets the second condition, the first Uu priority is a medium priority; and (6) when the first SL priority meets a third condition (the specific content of the third condition may be set with reference to the first condition and the second condition), the first Uu priority is a low priority.

For specific priorities of other priority type quantities, the manner of determining the first Uu priority according to the first SL priority may be set based on the same principle, and details are not described herein again.

In some implementations, the first Uu priority of target resource includes one or more of the following:

(1) A first specific Uu priority in the Uu priority of the at least part of information corresponding to the target resource.

The foregoing first specific Uu priority may be the highest or lowest Uu priority among the Uu priorities of the information corresponding to the target resource.

Preferably, the at least part of information corresponding to the target resource is all information corresponding to the target resource.

For example: the target resource corresponds to 3 HARQ-ACK bits, and the corresponding Uu priorities are high, low, and high respectively, then the Uu priority of the target resource is high or low.

(2) A Uu priority corresponding to a specific SL priority in an SL priority of the at least part of information corresponding to the target resource.

The foregoing specific SL priority may be the Uu priority corresponding to the highest or lowest SL priority among the SL priorities of the information corresponding to the target resource.

Preferably, the at least part of information corresponding to the target resource is all information corresponding to the target resource.

For example: the target resource corresponds to 3 HARQ-ACK bits, the corresponding SL priorities are the SL priorities corresponding to the priority values 1, 1, and 8 respectively, and the Uu priority corresponding to the SL priority value 1 is high, then the Uu priority of the target resource is high.

(3) The Uu priority of the at least part of information corresponding to the target resource.

For example: the target resource corresponds to 3 HARQ-ACK bits, and the corresponding Uu priorities are high/low/high respectively, then the Uu priority of the target resource includes high and low.

Similarly, a first Uu priority value of the target resource includes one or more of the following:

(1) A first specific Uu priority value in a Uu priority value of the at least part of information corresponding to the target resource.

The foregoing first specific Uu priority value may be the highest or lowest Uu priority value among the Uu priority values of the information corresponding to the target resource.

Preferably, the at least part of information corresponding to the target resource is all information corresponding to the target resource.

For example: the target resource corresponds to 3 HARQ-ACK bits, and the corresponding Uu priority values are 1, 1, and 0 respectively, then the Uu priority value of the target resource is 1 or 0.

(2) A Uu priority value corresponding to a specific SL priority value in an SL priority value of the at least part of information corresponding to the target resource.

The foregoing specific SL priority value may be the Uu priority value corresponding to the highest or lowest SL priority value among the SL priority values of the information corresponding to the target resource.

Preferably, the at least part of information corresponding to the target resource is all information corresponding to the target resource.

For example: the target resource corresponds to 3 HARQ-ACK bits, the corresponding SL priority values are 1, 1, and 8, and the Uu priority value corresponding to 1 is 1, then the Uu priority value of the target resource is 1.

(3) A Uu priority value of the at least part of information corresponding to the target resource.

Preferably, the at least part of information corresponding to the target resource is all information corresponding to the target resource.

For example: the target resource corresponds to 3 HARQ-ACK bits, and the corresponding Uu priority values are 1, 1, and 0 respectively, then the Uu priority value of the target resource includes 1 and 0.

It is to be noted that, In the embodiments of the present application, the correspondence between the priority value and the priority can be in a positive order or a reverse order, where the positive order means that a greater priority value indicates a higher priority; and the reverse order means that a greater priority value indicates a lower priority; and the foregoing example is described in a case of the reverse order. It may be understood that it is also applicable to a case of the positive order.

In some implementations, the target resource includes one or more of the following:

(1) A resource on which a target object is located, for example, an SL resource, where the target object includes an SL channel, an SL signal, SL signaling, SL information, and/or an SL message.

For example: the SL information is SL HARQ-ACK.

(2) A Uu channel, signal, and/or resource used for transmitting or indicating target content, where the target content includes the SL signal, the SL signaling, the SL information, and/or the SL message.

The foregoing transmission includes: forwarding, bearing, carrying, reporting, and the like.

For example: the target resource may be a PUCCH and/or PUSCH carrying SL HARQ-ACK, or a PUCCH carrying SL SR, or a PUCCH and/or PUSCH carrying SL CSI.

(3) SL HARQ-ACK.

(4) An uplink resource carrying the SL HARQ-ACK (PUCCH and/or PUSCH).

In some implementations, the information corresponding to the target resource may be at least one of the following:

(1) information that the target resource intends to, expects to, and may forward, bear, carry and/or report; or (2) information related to the target resource.

The following describes the method provided in the present application with reference to specific embodiments:

In the following embodiments, the SL PUCCH is a PUCCH that carries SL-related information (such as SL HARQ-ACK).

Embodiment 1: Different priorities cannot be multiplexed.

Optionally, when a Uu PUSCH of which the priority is a low priority or priority low or priority index 0 or is eMBB and an SL PUCCH of which the priority is a high priority or priority high or priority index 1 or is URLLC overlap, or meet a collision condition, or meet a multiplexing condition, the SL HARQ-ACK on the SL PUCCH cannot be multiplexed on the PUSCH.

Optionally, when a Uu PUSCH of which the priority is a high priority or priority high or priority index 1 or is URLLC and an SL PUCCH of which the priority is a low priority or priority low or priority index 0 or is eMBB overlap, or meet a collision condition, or meet a multiplexing condition, the SL HARQ-ACK on the SL PUCCH cannot be multiplexed on the PUSCH.

Embodiment 2: The same priority can be multiplexed.

Optionally, when a Uu PUSCH of which the priority is a high priority or priority high or priority index 1 or is URLLC and an SL PUCCH of which the priority is a high priority or priority high or priority index 1 or is URLLC overlap, or meet a collision condition, or meet a multiplexing condition, the SL HARQ-ACK on the SL PUCCH can be multiplexed on the PUSCH.

Optionally, when a Uu PUSCH of which the priority is a low priority or priority low or priority index 0 or is eMBB and an SL PUCCH of which the priority is a low priority or priority low or priority index 0 or is eMBB overlap, or meet a collision condition, or meet a multiplexing condition, the SL HARQ-ACK on the SL PUCCH can be multiplexed on the PUSCH.

Embodiment 3: It can only be multiplexed on a PUSCH of which the priority is not indicated or is a low priority or priority low or priority index 0 or is eMBB.

Optionally, when a Uu PUSCH of which the priority is not indicated or is a low priority or priority low or priority index 0 or is eMBB and an SL PUCCH overlap, or meet a collision condition, or meet a multiplexing condition, the SL HARQ-ACK on the SL PUCCH can be multiplexed on the PUSCH of which the priority is eMBB.

Optionally, when a Uu PUSCH of which the priority is indicated or is a high priority or priority high or priority index 1 or is URLLC and an SL PUCCH overlap, or meet a collision condition, or meet a multiplexing condition, the SL HARQ-ACK on the SL PUCCH cannot be multiplexed on a PUSCH of which the priority is indicated or is a high priority or priority high or priority index 1 or is URLLC.

Embodiment 4: The SL HARQ-ACK can be only allowed to be multiplexed on a PUSCH of a low priority or priority low or priority index 0 or eMBB, or a PUSCH without priority (for example, a PUSCH scheduled by a DCI format and having no priority indicator field).

Referring to FIG. 4, an embodiment of the present application provides a transmission apparatus 400, applicable to a communication device. The communication device may be a terminal or a network-side device. The apparatus 400 includes:

a first determining module 401, configured to determine target transmission when a target resource and a first resource at least partially overlap, meet a collision condition, or meet a multiplexing condition, where the target resource is related to a sidelink SL, the target resource has or does not have a first Uu priority, the first resource has or does not have a second Uu priority, and the first Uu priority of the target resource includes: a Uu priority of the target resource and/or a Uu priority of at least part of information corresponding to the target resource; the target resource has a first SL priority, and the first SL priority of the target resource includes: an SL priority of the target resource and/or a sidelink SL priority of the at least part of information corresponding to the target resource.

In some implementations, that the first resource has a second Uu priority is specifically at least one of the following:

a network side schedules, configures, or indicates the second Uu priority of the first resource; or the second Uu priority of the first resource is predefined or pre-configured.

In some implementations, that the first resource does not have a second Uu priority is specifically at least one of the following:

a network side schedules, configures, or indicates no second Uu priority of the first resource; or no second Uu priority of the first resource is predefined or pre-configured.

In some implementations, the first resource is used for at least one of the following:

URLLC transmission;

transmission greater than a priority threshold;

transmission meeting a reliability requirement;

transmission less than a delay threshold and having a packet delay budget PDB less than a PDB threshold or a remaining PDB less than a remaining PDB threshold;

eMBB transmission;

transmission less than a priority threshold;

transmission not meeting a reliability requirement; or transmission higher than a delay threshold and having a PDB greater than a PDB threshold or a remaining PDB greater than a remaining PDB threshold.

In some implementations, the method further includes:

determining the first Uu priority of the target resource according to a first SL priority of the target resource based on a mapping relationship.

In some implementations, the first Uu priority of the target resource is a specific priority;

or in a case that the first SL priority of the target resource meets a specific condition, the first Uu priority of the target resource is a specific priority.

In some implementations, the specific priority includes at least one of a first priority or a second priority.

In some implementations, the specific condition includes at least one of a first condition or a second condition.

In some implementations, in a case that the first SL priority of the target resource meets a first condition, the first Uu priority of the target resource is a first priority;

and/or in a case that the first SL priority of the target resource meets a second condition, the first Uu priority of the target resource is a second priority.

In some implementations, the first condition includes one or more of the following:

the first SL priority of the target resource is higher than or equal to a first preset priority;

a first SL priority value of the target resource is less than or equal to a first preset priority value;

no second preset priority and/or second preset priority value is configured or acquired; and the second condition is not met.

In some implementations, the second condition includes one or more of the following:

the first SL priority of the target resource is higher than or equal to a third preset priority;

a first SL priority value of the target resource is less than or equal to a third preset priority value;

no fourth preset priority and/or fourth preset priority value is configured;

the first SL priority of the target resource is lower than or equal to a fifth preset priority;

a first SL priority value of the target resource is greater than or equal to a fifth preset priority value; and the first condition is not met.

In some implementations, the first Uu priority of target resource includes one or more of the following:

a first specific Uu priority in the Uu priority of the at least part of information corresponding to the target resource;

a Uu priority corresponding to a specific SL priority in an SL priority of the at least part of information corresponding to the target resource; and the Uu priority of the at least part of information corresponding to the target resource.

In some implementations, a first Uu priority value of the target resource includes one or more of the following:

a first specific Uu priority value in a Uu priority value of the at least part of information corresponding to the target resource;

a Uu priority value corresponding to a specific SL priority value in an SL priority value of the at least part of information corresponding to the target resource; and a Uu priority value of the at least part of information corresponding to the target resource.

In some implementations, the target resource includes one or more of the following:

a resource on which a target object is located, where the target object includes an SL channel, an SL signal, SL signaling, SL information, and/or an SL message;

a Uu channel, signal, and/or resource used for transmitting or indicating target content, where the target content includes the SL signal, the SL signaling, the SL information, and/or the SL message;

SL hybrid automatic repeat request acknowledgement HARQ-ACK; and an uplink resource carrying the SL HARQ-ACK.

In some implementations, the target resource has the first Uu priority, the first resource has the second Uu priority, and the determining module is further configured to at least one of the following:

transmit the at least part of information corresponding to the target resource in a case that the first Uu priority of the target resource is the same as the second Uu priority of the first resource or a difference value therebetween is less than a first preset difference value; or skip transmitting the at least part of information corresponding to the target resource in a case that the first Uu priority of the target resource is different from the second Uu priority of the first resource or a difference value therebetween is greater than a second preset difference value.

In some implementations, the apparatus further includes:

a transmission module, configured to transmit the target resource or the first resource according to a Uu priority in a case that the first Uu priority of the target resource is different from the second Uu priority of the first resource or the difference value therebetween is greater than the second preset difference value.

In some implementations, the determining module is further configured to at least one of the following:

transmit the at least part of information corresponding to the target resource in a case that the first Uu priority of the target resource is the same as the second Uu priority of the first resource and is a first priority; or transmit the at least part of information corresponding to the target resource in a case that the first Uu priority of the target resource is the same as the second Uu priority of the first resource and is a second priority.

In some implementations, the first determining module is further configured to at least one of the following:

skip transmitting the at least part of information corresponding to the target resource in a case that the first Uu priority of the target resource is a first priority and the second Uu priority of the first resource is a second priority; or skip transmitting the at least part of information corresponding to the target resource in a case that the first Uu priority of the target resource is a second priority and the second Uu priority of the first resource is a first priority.

In some implementations, the target resource has the first Uu priority, the first resource has or does not have the second Uu priority, and the first determining module is further configured to at least one of the following:

transmit the at least part of information corresponding to the target resource in a case that the first Uu priority of the target resource is higher than or equal to a first specific priority, and/or lower than or equal to a second specific priority; or skip transmitting the at least part of information corresponding to the target resource in a case that the first Uu priority of the target resource is higher than or equal to a third specific priority, and/or lower than or equal to a fourth specific priority.

In some implementations, the target resource has or does not have the first Uu priority, the first resource has the second Uu priority, and the first determining module is further configured to at least one of the following:

skip transmitting the at least part of information corresponding to the target resource in a case that the second Uu priority of the first resource is a first priority; or transmit the at least part of information corresponding to the target resource in a case that the second Uu priority of the first resource is a second priority, where the first priority is higher than the second priority.

In some implementations, the target resource has or does not have the first Uu priority, the first resource has the second Uu priority, and the first determining module is further configured to at least one of the following:

transmit the at least part of information corresponding to the target resource in a case that the second Uu priority of the first resource is a first priority; or skip transmitting the at least part of information corresponding to the target resource in a case that the second Uu priority of the first resource is a second priority, where the first priority is higher than the second priority.

In some implementations, the first determining module is further configured to at least one of the following:

transmit the at least part of information corresponding to the target resource on the first resource;

transmit the at least part of information corresponding to the target resource in a case that a first SL priority of the target resource is higher than or equal to a fifth specific priority, and/or lower than or equal to a sixth specific priority; or skip transmitting the at least part of information corresponding to the target resource in a case that a first SL priority of the target resource is higher than or equal to a seventh specific priority, and/or lower than or equal to an eighth specific priority.

In some implementations, transmitting the at least part of information corresponding to the target resource in a case that the first resource has the second Uu priority, and/or first control signaling carries priority indication information, where the first control signaling is used for scheduling, configuring, or indicating the first resource.

In some implementations, transmitting the at least part of information corresponding to the target resource in a case that the first resource does not have the second Uu priority, and/or first control signaling carries no priority indication information, where the first control signaling is used for scheduling, configuring, or indicating the first resource.

In some implementations, in a case of transmitting the at least part of information corresponding to the target resource, the at least part of information includes at least one of the following:

all information corresponding to the target resource;

information equal to the second Uu priority of the first resource;

information not lower than the second Uu priority of the first resource;

information not higher than the second Uu priority of the first resource;

information corresponding to a first SL priority higher than a sixth preset priority;

information corresponding to a first SL priority value less than a sixth preset priority value;

information corresponding to a first Uu priority higher than a seventh preset priority;

information corresponding to a first Uu priority value less than a seventh preset priority value;

information corresponding to a first SL priority lower than an eighth preset priority;

information corresponding to a first SL priority value higher than an eighth preset priority value;

information corresponding to a first Uu priority lower than a ninth preset priority; or information corresponding to a first Uu priority value higher than a ninth preset priority value.

In some implementations, in a case of skipping transmitting the at least part of information corresponding to the target resource, the at least part of information includes at least one of the following:

all information corresponding to the target resource;

information not equal to the second Uu priority corresponding to the first resource;

information not lower than the second Uu priority corresponding to the first resource;

information not higher than the second Uu priority corresponding to the first resource;

information corresponding to a first SL priority lower than a tenth preset priority;

information corresponding to a first SL priority value higher than a tenth preset priority value;

information corresponding to a first Uu priority lower than an eleventh preset priority;

information corresponding to a first Uu priority value higher than an eleventh preset priority value;

information corresponding to a first SL priority higher than a twelfth preset priority;

information corresponding to a first SL priority value less than a twelfth preset priority value;

information corresponding to a first Uu priority higher than a thirteenth preset priority; or information corresponding to a first Uu priority value less than a thirteenth preset priority value.

In some implementations, in a case that a plurality of first resources and the target resource overlap, meet the collision condition, or meet the multiplexing condition, the first determining module is further configured to:

determine the target transmission according to the first Uu priority of the target resource and/or the second Uu priority of each of the plurality of first resources.

In some implementations, in a case that a plurality of first resources and the target resource overlap, meet the collision condition, or meet the multiplexing condition, the first determining module is further configured to:

determine the target transmission according to the second Uu priority of each of the plurality of first resources in a preset order, where the preset order includes: a time domain order of the plurality of first resources, a frequency domain position order of the plurality of first resources, an identifier order of the plurality of first resources, and/or a second Uu priority order of the plurality of first resources;

or determine the target transmission according to a second specific Uu priority in the second Uu priority.

In some implementations, a priority of the target transmission is any one of the following:

the second Uu priority of the first resource;

the first Uu priority of the target resource; or a first SL priority of the target resource.

In some implementations, in a case that the priority of the target transmission is the second Uu priority of the first resource, the second Uu priority of the first resource is higher than the first Uu priority or the first SL priority of the target resource;

or in a case that the priority of the target transmission is the first Uu priority or the first SL priority of the target resource, the first Uu priority or the first SL priority of the target resource is higher than the second Uu priority of the first resource.

In some implementations, the first resource is a physical uplink control channel PUCCH and/or physical uplink shared channel PUSCH resource. For example, the first resource may be a PUCCH and/or PUSCH with a Uu priority, for example, a PUCCH and/or PUSCH that can correspond to information having a corresponding Uu priority. The first resource may alternatively be other uplink signals, such as uplink reference signals, which are specifically an SRS and a PRS.

In some implementations, a Uu priority is at least one of the following:

a priority indicated by physical layer signaling;

a priority configured by a high layer;

a service priority; or a logic channel priority.

In the embodiments of the present application, when the target resource and the first resource at least partially overlap or meet the collision condition, the target transmission is determined based on whether the target resource has a first Uu priority or not, whether the first resource has a second Uu priority or not, the first Uu priority of the target resource, and/or the second Uu priority of the first resource, thereby ensuring consistent understanding between a network side and a terminal side, and improving sidelink reliability.

Figure 5:
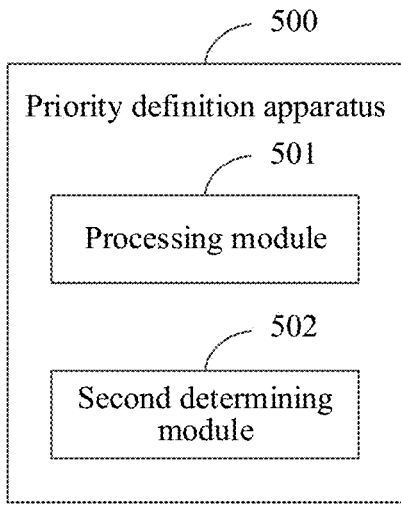
FIG. 5 is a schematic structural diagram of a priority definition apparatus according to an embodiment of the present application.

Referring to FIG. 5, an embodiment of the present application provides a priority definition apparatus 500, applicable to a communication device. The communication device may be a terminal or a network-side device. The apparatus 500 includes:

a processing module 501, configured to configure or acquire a mapping relationship between a first Uu priority and a first SL priority of a target resource; and a second determining module 502, configured to determine the first Uu priority of the target resource according to the mapping relationship, where the target resource is related to an SL, and the first Uu priority of the target resource includes: a Uu priority of the target resource and/or a Uu priority of at least part of information corresponding to the target resource; and the first SL priority of the target resource includes: an SL priority of the target resource and/or a sidelink SL priority of the at least part of information corresponding to the target resource.

In some implementations, the mapping relationship meets that:

the first Uu priority of the target resource is a specific priority;

or in a case that the first SL priority of the target resource meets a specific condition, the first Uu priority of the target resource is a specific priority corresponding to the specific condition.

In some implementations, the specific priority includes at least one of a first priority or a second priority.

In some implementations, the specific condition includes at least one of a first condition or a second condition.

In some implementations, in a case that the first SL priority of the target resource meets a first condition, the first Uu priority of the target resource is a first priority;

and/or in a case that the first SL priority of the target resource meets a second condition, the first Uu priority of the target resource is a second priority.

In some implementations, the first condition includes one or more of the following:

the first SL priority of the target resource is higher than or equal to a first preset priority;

a first SL priority value of the target resource is less than or equal to a first preset priority value;

no second preset priority and/or second preset priority value is configured or acquired; and the second condition is not met.

In some implementations, the second condition includes one or more of the following:

the first SL priority of the target resource is higher than or equal to a third preset priority;

a first SL priority value of the target resource is less than or equal to a third preset priority value;

no fourth preset priority and/or fourth preset priority value is configured or acquired;

the first SL priority of the target resource is lower than or equal to a fifth preset priority;

a first SL priority value of the target resource is greater than or equal to a fifth preset priority value; and the first condition is not met.

In some implementations, the first Uu priority of the target resource is any one of the following:

a first specific Uu priority in the Uu priority of the at least part of information corresponding to the target resource;

a Uu priority corresponding to a specific SL priority in an SL priority of the at least part of information corresponding to the target resource; and the Uu priority of the information corresponding to the target resource.

In some implementations, a first Uu priority value of the target resource is any one of the following:

a first specific Uu priority value in a Uu priority value of the at least part of information corresponding to the target resource;

a Uu priority value corresponding to a specific SL priority value in an SL priority value of the at least part of information corresponding to the target resource; and a Uu priority value of the at least part of information corresponding to the target resource.

In some implementations, the target resource includes one or more of the following:

a resource on which a target object is located, where the target object includes an SL channel, an SL signal, SL signaling, SL information, and/or an SL message;

a Uu channel, signal, and/or resource used for transmitting or indicating target content, where the target content includes the SL signal, the SL signaling, the SL information, and/or the SL message;

SL HARQ-ACK; or an uplink resource carrying the SL HARQ-ACK.

the transmission apparatus and the priority definition apparatus in the foregoing embodiments of the present application may be apparatuses having an operating system. The operating system may be an Android (Android) operating system, an iOS operating system, or another possible operating system, which is not specifically limited in this embodiment of the present application.

The transmission apparatus provided in the embodiments of the present application can implement various processes implemented in the method embodiment of FIG. 2, the priority definition apparatus provided in the embodiments of the present application can implement various processes implemented in the method embodiment of FIG. 3, and achieve the same technical effects. To avoid repetition, details are not described herein again.

Figure 6:
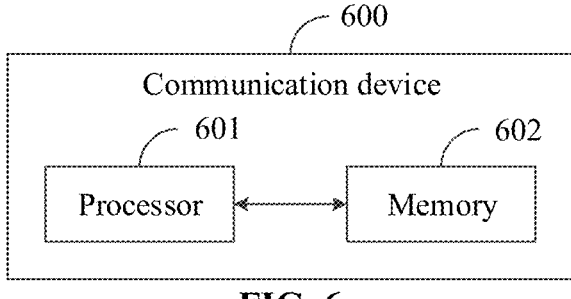
FIG. 6 is a schematic structural diagram of a communication device according to an embodiment of the present application.

As shown in FIG. 6, an embodiment of the present application further provides a communication device 600, including a processor 601, a memory 602, and a program or instructions stored in the memory 602 and executable on the processor 601. For example, in a case that the communication device 600 is a terminal or a network-side device, the program or instructions, when executed by the processor 601, implement various processes of the foregoing embodiment of the transmission method, or implement various processes of the foregoing embodiment of the priority definition method, and the same technical effects can be achieved. To avoid repetition, details are not described herein again.

An embodiment of the present application further provides a readable storage medium, storing a program or instructions, the program or instructions, when executed by a processor, implementing various processes of the foregoing embodiment of the transmission method, or implementing various processes of the foregoing embodiment of the priority definition method, and the same technical effects can be achieved. To avoid repetition, details are not described herein again.

The processor is the processor in the terminal in the foregoing embodiments. The readable storage medium includes a computer-readable storage medium, and may be, for example, a read-only memory (Read-Only Memory, ROM), a random access memory (Random Access Memory, RAM), a magnetic disk, or an optical disc.

Figure 7:
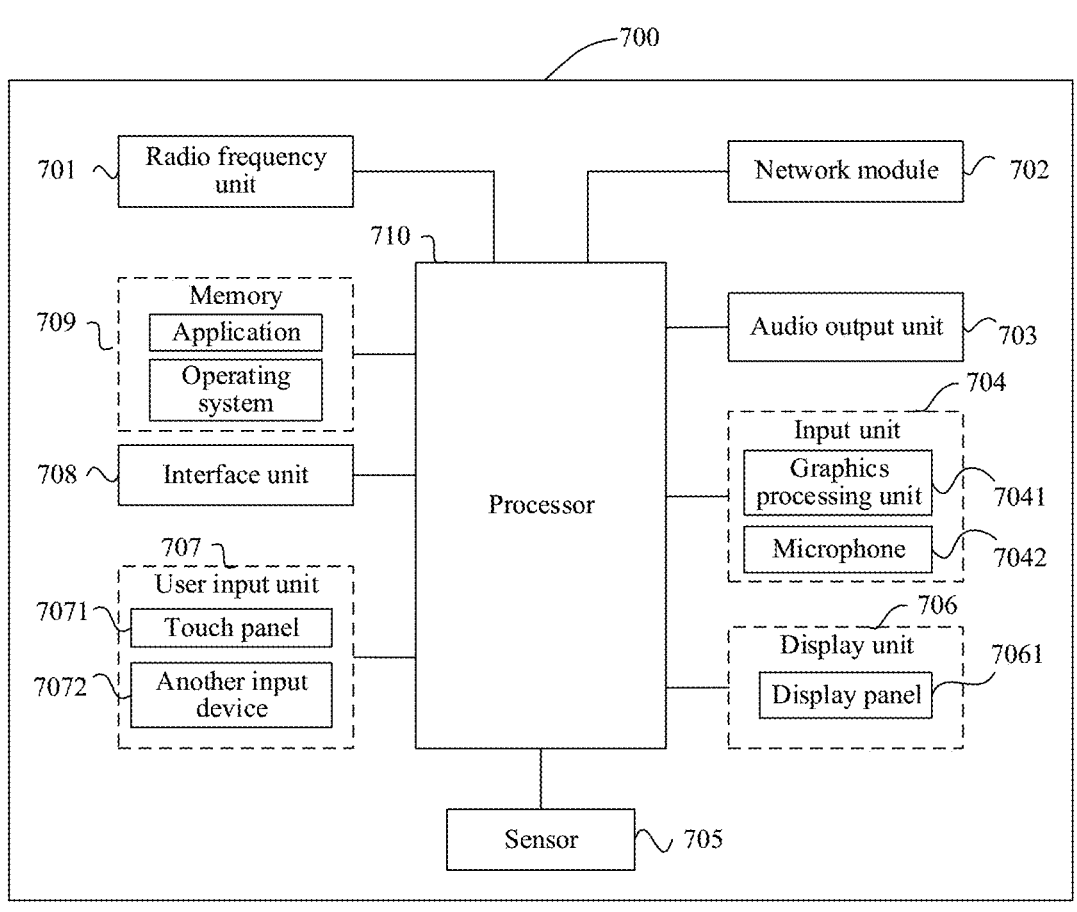
FIG. 7 is a schematic structural diagram of a terminal according to an embodiment of the present application.

The communication device in the embodiments of the present application may specifically be a terminal. FIG. 7 is a schematic diagram of a hardware structure of a terminal for implementing embodiments of the present application.

The terminal 700 includes, but is not limited to, components such as a radio frequency unit 701, a network module 702, an audio output unit 703, an input unit 704, a sensor 705, a display unit 706, a user input unit 707, an interface unit 708, a memory 709, and a processor 710.

A person skilled in the art may understand that the terminal 700 may further include the power supply (such as a battery) for supplying power to the components. The power supply may be logically connected to the processor 710 by using a power management system, thereby implementing functions, such as charging, discharging, and power consumption management, by using the power management system. A terminal structure shown in FIG. 7 does not constitute a limitation to the terminal, and the terminal may include more or fewer components than those shown in the figure, or some components may be combined, or a different component deployment may be used. Details are not described herein again.

It should be understood that in the embodiments of the present application, the input unit 704 may include a graphics processing unit (Graphics Processing Unit, GPU) 7041 and a microphone 7042. The graphics processing unit 7041 performs processing on image data of a static picture or a video that is obtained by an image acquisition apparatus (for example, a camera) in a video acquisition mode or an image acquisition mode. The display unit 706 may include a display panel 7061. The display panel 7061 may be configured in the form of a liquid crystal display, an organic light-emitting diode, or the like. The input unit 707 may include a touch panel 7071 and another input device 7072. The touch panel 7071 is also referred to as a touch screen. The touch panel 7071 may include a touch detection apparatus and a touch controller. The another input device 7072 may include, but not limited to, a physical keyboard, a functional key (such as a volume control key or a switch key), a track ball, a mouse, and a joystick. Details are not described herein again.

In the embodiments of the present application, the radio frequency unit 701 receives downlink data from a radio access network-side device, then transmits the downlink data to the processor 710 for processing, and transmits uplink data to the radio access network-side device. Generally, the radio frequency circuit 701 includes, but is not limited to, an antenna, at least one amplifier, a transceiver, a coupler, a low noise amplifier, a duplexer, and the like.

The memory 709 is configured to store a software program or instructions and various data. The memory 709 may mainly include a program or instruction storage area and a data storage area. The program or instruction storage area may store an operating system, an application or instructions required by at least one function (for example, a sound playback function and an image display function), and the like. In addition, the memory 709 may include a high-speed random access memory, or may further include a non-volatile memory. The non-volatile memory may be a read-only memory (Read-Only Memory, ROM), a programmable ROM (Programmable ROM, PROM), an erasable PROM (Erasable PROM, EPROM), an electrically EPROM (Electrically EPROM, EEPROM), or a flash memory, for example, at least one magnetic disk storage device, a flash memory, or another non-volatile solid-state storage device.

The processor 710 may include one or more processing units. Optionally, the processor 710 may integrate an application processor and a modem processor. The application processor mainly handles operating systems, user interfaces, applications, instructions, or the like. The modem processor mainly handles wireless communication, and may be, for example, a baseband processor. It can be understood that, the modem processor may not be integrated into the processor 710.

The processor 710 is used as a first determining module 401, configured to determine target transmission when a target resource and a first resource at least partially overlap, meet a collision condition, or meet a multiplexing condition, where the target resource is related to a sidelink SL, the target resource has or does not have a first Uu priority, the first resource has or does not have a second Uu priority, and the first Uu priority of the target resource includes: a Uu priority of the target resource and/or a Uu priority of at least part of information corresponding to the target resource.

In some implementations, that the first resource has a second Uu priority is specifically at least one of the following:

a network side schedules, configures, or indicates the second Uu priority of the first resource; or
the second Uu priority of the first resource is predefined or pre-configured.

In some implementations, that the first resource does not have a second Uu priority is specifically at least one of the following:

a network side schedules, configures, or indicates no second Uu priority of the first resource; or
no second Uu priority of the first resource is predefined or pre-configured.

In some implementations, the first resource is used for at least one of the following:

URLLC transmission;
transmission greater than a priority threshold;
transmission meeting a reliability requirement;
transmission less than a delay threshold and having a packet delay budget PDB less than a PDB threshold or a remaining PDB less than a remaining PDB threshold;
eMBB transmission;
transmission less than a priority threshold;
transmission not meeting a reliability requirement; or
transmission higher than a delay threshold and having a PDB greater than a PDB threshold or a remaining PDB greater than a remaining PDB threshold.

In some implementations, the processor 710 is configured to determine the first Uu priority of the target resource according to a first SL priority of the target resource based on a mapping relationship, where the first SL priority of the target resource includes: an SL priority of the target resource and/or a sidelink SL priority of the at least part of information corresponding to the target resource.

In some implementations, the first Uu priority of the target resource is a specific priority;

or
in a case that the first SL priority of the target resource meets a specific condition, the first Uu priority of the target resource is a specific priority.

In some implementations, the specific priority includes at least one of a first priority or a second priority.

In some implementations, the specific condition includes at least one of a first condition or a second condition.

In some implementations, in a case that the first SL priority of the target resource meets a first condition, the first Uu priority of the target resource is a first priority;

and/or
in a case that the first SL priority of the target resource meets a second condition, the first Uu priority of the target resource is a second priority.

In some implementations, the first condition includes one or more of the following:

the first SL priority of the target resource is higher than or equal to a first preset priority;
a first SL priority value of the target resource is less than or equal to a first preset priority value;
no second preset priority and/or second preset priority value is configured or acquired; and
the second condition is not met.

In some implementations, the second condition includes one or more of the following:

the first SL priority of the target resource is higher than or equal to a third preset priority;
a first SL priority value of the target resource is less than or equal to a third preset priority value;
no fourth preset priority and/or fourth preset priority value is configured;
the first SL priority of the target resource is lower than or equal to a fifth preset priority;
a first SL priority value of the target resource is greater than or equal to a fifth preset priority value; and
the first condition is not met.

In some implementations, the first Uu priority of target resource includes one or more of the following:

a first specific Uu priority in the Uu priority of the at least part of information corresponding to the target resource;
a Uu priority corresponding to a specific SL priority in an SL priority of the at least part of information corresponding to the target resource; and
the Uu priority of the at least part of information corresponding to the target resource.

In some implementations, a first Uu priority value of the target resource includes one or more of the following:

a first specific Uu priority value in a Uu priority value of the at least part of information corresponding to the target resource;
a Uu priority value corresponding to a specific SL priority value in an SL priority value of the at least part of information corresponding to the target resource; and
a Uu priority value of the at least part of information corresponding to the target resource.

In some implementations, the target resource includes one or more of the following:

a resource on which a target object is located, where the target object includes an SL channel, an SL signal, SL signaling, SL information, and/or an SL message;
a Uu channel, signal, and/or resource used for transmitting or indicating target content, where the target content includes the SL signal, the SL signaling, the SL information, and/or the SL message;
SL hybrid automatic repeat request acknowledgement HARQ-ACK; and
an uplink resource carrying the SL HARQ-ACK.

In some implementations, the target resource has the first Uu priority, the first resource has the second Uu priority, and the processor 710 is configured to at least one of the following:

transmit the at least part of information corresponding to the target resource in a case that the first Uu priority of the target resource is the same as the second Uu priority of the first resource or a difference value therebetween is less than a first preset difference value; or
skip transmitting the at least part of information corresponding to the target resource in a case that the first Uu priority of the target resource is different from the second Uu priority of the first resource or a difference value therebetween is greater than a second preset difference value.

In some implementations, the processor 710 is configured to transmit the target resource or the first resource according to a Uu priority in a case that the first Uu priority of the target resource is different from the second Uu priority of the first resource or the difference value therebetween is greater than the second preset difference value.

In some implementations, the processor 710 is configured to at least one of the following:

transmit the at least part of information corresponding to the target resource in a case that the first Uu priority of the target resource is the same as the second Uu priority of the first resource and is a first priority; or transmit the at least part of information corresponding to the target resource in a case that the first Uu priority of the target resource is the same as the second Uu priority of the first resource and is a second priority.

In some implementations, the processor 710 is configured to at least one of the following:

skip transmitting the at least part of information corresponding to the target resource in a case that the first Uu priority of the target resource is a first priority and the second Uu priority of the first resource is a second priority; or skip transmitting the at least part of information corresponding to the target resource in a case that the first Uu priority of the target resource is a second priority and the second Uu priority of the first resource is a first priority.

In some implementations, the target resource has the first Uu priority, the first resource has or does not have the second Uu priority, and the processor 710 is configured to at least one of the following:

transmit the at least part of information corresponding to the target resource in a case that the first Uu priority of the target resource is higher than or equal to a first specific priority, and/or lower than or equal to a second specific priority; or skip transmitting the at least part of information corresponding to the target resource in a case that the first Uu priority of the target resource is higher than or equal to a third specific priority, and/or lower than or equal to a fourth specific priority.

In some implementations, the target resource has or does not have the first Uu priority, the first resource has the second Uu priority, and the processor 710 is configured to at least one of the following:

skip transmitting the at least part of information corresponding to the target resource in a case that the second Uu priority of the first resource is a first priority; or transmit the at least part of information corresponding to the target resource in a case that the second Uu priority of the first resource is a second priority, where the first priority is higher than the second priority.

In some implementations, the target resource has or does not have the first Uu priority, the first resource has the second Uu priority, and the processor 710 is configured to at least one of the following:

transmit the at least part of information corresponding to the target resource in a case that the second Uu priority of the first resource is a first priority; or skip transmitting the at least part of information corresponding to the target resource in a case that the second Uu priority of the first resource is a second priority, where the first priority is higher than the second priority.

In some implementations, the processor 710 is configured to at least one of the following:

transmit the at least part of information corresponding to the target resource on the first resource;

transmit the at least part of information corresponding to the target resource in a case that a first SL priority of the target resource is higher than or equal to a fifth specific priority, and/or lower than or equal to a sixth specific priority; or skip transmitting the at least part of information corresponding to the target resource in a case that a first SL priority of the target resource is higher than or equal to a seventh specific priority, and/or lower than or equal to an eighth specific priority.

In some implementations, transmitting the at least part of information corresponding to the target resource in a case that the first resource has the second Uu priority, and/or first control signaling carries priority indication information, where the first control signaling is used for scheduling, configuring, or indicating the first resource.

In some implementations, transmitting the at least part of information corresponding to the target resource in a case that the first resource does not have the second Uu priority, and/or first control signaling carries no priority indication information, where the first control signaling is used for scheduling, configuring, or indicating the first resource.

In some implementations, in a case of transmitting the at least part of information corresponding to the target resource, the at least part of information includes at least one of the following:

all information corresponding to the target resource;

information equal to the second Uu priority of the first resource;

information not lower than the second Uu priority of the first resource;

information not higher than the second Uu priority of the first resource;

information corresponding to a first SL priority higher than a sixth preset priority;

information corresponding to a first SL priority value less than a sixth preset priority value;

information corresponding to a first Uu priority higher than a seventh preset priority;

information corresponding to a first Uu priority value less than a seventh preset priority value;

information corresponding to a first SL priority lower than an eighth preset priority;

information corresponding to a first SL priority value higher than an eighth preset priority value;

information corresponding to a first Uu priority lower than a ninth preset priority; or information corresponding to a first Uu priority value higher than a ninth preset priority value.

In some implementations, in a case of skipping transmitting the at least part of information corresponding to the target resource, the at least part of information includes at least one of the following:

all information corresponding to the target resource;

information not equal to the second Uu priority corresponding to the first resource;

information not lower than the second Uu priority corresponding to the first resource;

information not higher than the second Uu priority corresponding to the first resource;

information corresponding to a first SL priority lower than a tenth preset priority;

information corresponding to a first SL priority value higher than a tenth preset priority value;

information corresponding to a first Uu priority lower than an eleventh preset priority;

information corresponding to a first Uu priority value higher than an eleventh preset priority value;

information corresponding to a first SL priority higher than a twelfth preset priority;

information corresponding to a first SL priority value less than a twelfth preset priority value;

information corresponding to a first Uu priority higher than a thirteenth preset priority; or information corresponding to a first Uu priority value less than a thirteenth preset priority value.

In some implementations, in a case that a plurality of first resources and the target resource overlap, meet the collision condition, or meet the multiplexing condition, the processor 710 is configured to:

determine the target transmission according to the first Uu priority of the target resource and/or the second Uu priority of each of the plurality of first resources.

In some implementations, in a case that a plurality of first resources and the target resource overlap, meet the collision condition, or meet the multiplexing condition, the processor 710 is configured to:

determine the target transmission according to the second Uu priority of each of the plurality of first resources in a preset order, where the preset order includes: a time domain order of the plurality of first resources, a frequency domain position order of the plurality of first resources, an identifier order of the plurality of first resources, and/or a second Uu priority order of the plurality of first resources;

or determine the target transmission according to a second specific Uu priority in the second Uu priority.

In some implementations, a priority of the target transmission is any one of the following:

the second Uu priority of the first resource;

the first Uu priority of the target resource; or a first SL priority of the target resource.

In some implementations, in a case that the priority of the target transmission is the second Uu priority of the first resource, the second Uu priority of the first resource is higher than the first Uu priority or the first SL priority of the target resource;

or in a case that the priority of the target transmission is the first Uu priority or the first SL priority of the target resource, the first Uu priority or the first SL priority of the target resource is higher than the second Uu priority of the first resource.

In some implementations, the first resource is a physical uplink control channel PUCCH and/or physical uplink shared channel PUSCH resource. For example, the first resource may be a PUCCH and/or PUSCH with a Uu priority, for example, a PUCCH and/or PUSCH that can correspond to information having a corresponding Uu priority. The first resource may alternatively be other uplink signals, such as uplink reference signals, which are specifically an SRS and a PRS.

In some implementations, a Uu priority is at least one of the following:

a priority indicated by physical layer signaling;

a priority configured by a high layer;

a service priority; or a logic channel priority.

In the embodiments of the present application, target transmission is determined when a target resource and a first resource at least partially overlap, meet a collision condition, or meet a multiplexing condition, thereby ensuring consistent understanding between a network side and a terminal side, and improving sidelink reliability.

The processor 710 is configured to: configure or acquire a mapping relationship between a first Uu priority and a first SL priority of a target resource; and determine the first Uu priority of the target resource according to the mapping relationship, where the target resource is related to an SL, and the first Uu priority of the target resource includes: a Uu priority of the target resource and/or a Uu priority of at least part of information corresponding to the target resource; the target resource has a first SL priority, and the first SL priority of the target resource includes: an SL priority of the target resource and/or a sidelink SL priority of the at least part of information corresponding to the target resource.

In some implementations, the mapping relationship meets that:

the first Uu priority of the target resource is a specific priority;

or in a case that the first SL priority of the target resource meets a specific condition, the first Uu priority of the target resource is a specific priority corresponding to the specific condition.

In some implementations, the specific priority includes at least one of a first priority or a second priority.

In some implementations, the specific condition includes at least one of a first condition or a second condition.

In some implementations, in a case that the first SL priority of the target resource meets a first condition, the first Uu priority of the target resource is a first priority;

and/or in a case that the first SL priority of the target resource meets a second condition, the first Uu priority of the target resource is a second priority.

In some implementations, the first condition includes one or more of the following:

the first SL priority of the target resource is higher than or equal to a first preset priority;

a first SL priority value of the target resource is less than or equal to a first preset priority value;

no second preset priority and/or second preset priority value is configured or acquired; and the second condition is not met.

In some implementations, the second condition includes one or more of the following:

the first SL priority of the target resource is higher than or equal to a third preset priority;

a first SL priority value of the target resource is less than or equal to a third preset priority value;

no fourth preset priority and/or fourth preset priority value is configured or acquired;

the first SL priority of the target resource is lower than or equal to a fifth preset priority;

a first SL priority value of the target resource is greater than or equal to a fifth preset priority value; and the first condition is not met.

In some implementations, the first Uu priority of the target resource is any one of the following:

a first specific Uu priority in the Uu priority of the at least part of information corresponding to the target resource;

a Uu priority corresponding to a specific SL priority in an SL priority of the at least part of information corresponding to the target resource; and the Uu priority of the information corresponding to the target resource.

In some implementations, a first Uu priority value of the target resource is any one of the following:

a first specific Uu priority value in a Uu priority value of the at least part of information corresponding to the target resource;

a Uu priority value corresponding to a specific SL priority value in an SL priority value of the at least part of information corresponding to the target resource; and a Uu priority value of the at least part of information corresponding to the target resource.

In some implementations, the target resource includes one or more of the following:

a resource on which a target object is located, where the target object includes an SL channel, an SL signal, SL signaling, SL information, and/or an SL message;

a Uu channel, signal, and/or resource used for transmitting or indicating target content, where the target content includes the SL signal, the SL signaling, the SL information, and/or the SL message;

SL HARQ-ACK; or an uplink resource carrying the SL HARQ-ACK.

In the embodiments of the present application, target transmission is determined when a target resource and a first resource at least partially overlap, meet a collision condition, or meet a multiplexing condition, thereby ensuring consistent understanding between a network side and a terminal side, and improving sidelink reliability.

Figure 8:
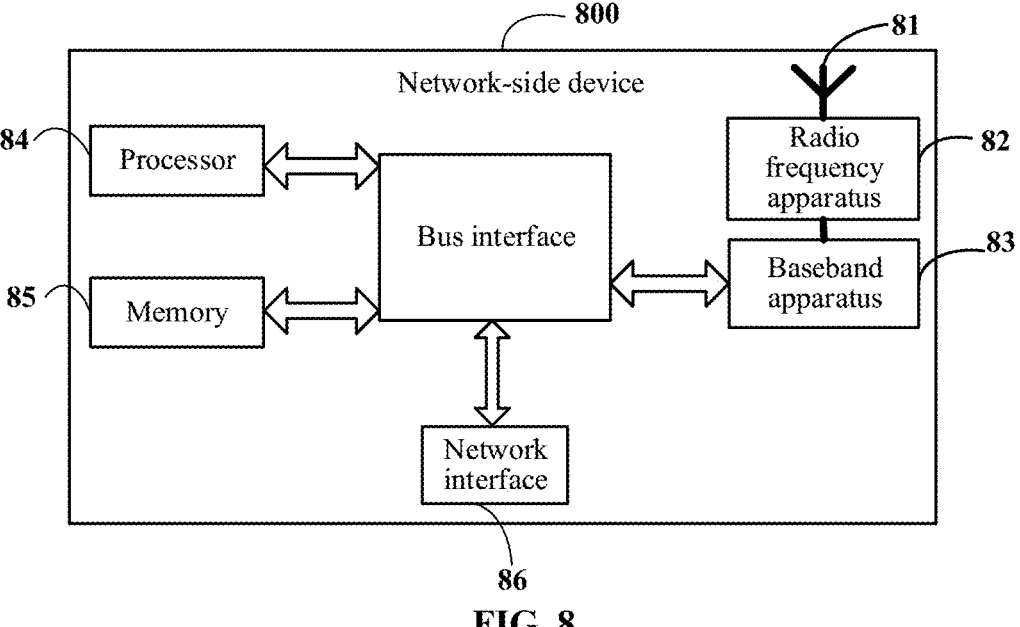
FIG. 8 is a schematic structural diagram of a network-side device according to an embodiment of the present application.

The communication device in the embodiments of the present application may specifically be a network-side device. As shown in FIG. 8, the network-side device 800 includes an antenna 81, a radio frequency apparatus 82, and a baseband apparatus 83. The antenna 81 is connected to the radio frequency apparatus 82. In an uplink direction, the radio frequency apparatus 82 receives information through the antenna 81, and transmits the received information to the baseband apparatus 83 for processing. In a downlink direction, the baseband apparatus 83 processes information to be transmitted, and transmits the information to the radio frequency apparatus 82. The radio frequency apparatus 82 processes the received information and then transmits the processed information out through the antenna 81.

The frequency band processing apparatus may be in the baseband apparatus 83, and the method performed by the network-side device in the foregoing embodiment may be implemented in the baseband apparatus 83, and the baseband apparatus 83 includes a processor 84 and a memory 85.

The baseband apparatus 83 may include, for example, at least one baseband plate. A plurality of chips are disposed on the baseband plate. As shown in FIG. 8, one of the plurality of chips is, for example, the processor 84, and is connected to the memory 85, to invoke a program in the memory 85 to perform operations of the network-side device shown in the foregoing method embodiment.

The baseband apparatus 83 may further include a network interface 86, configured to exchange information with the radio frequency apparatus 82. The interface is, for example, a common public radio interface (common public radio interface, CPRI).

Specifically, the network-side device in this embodiment of the present disclosure further include: instructions or a program stored in the memory 85 and runnable on the processor 84, where the processor 84 invokes the instructions or program in the memory 85 to perform the methods performed by the modules shown in FIG. 4 or FIG. 5, and can achieve the same technical effects. To avoid repetition, details are not described herein again.

An embodiment of the present application further provides a chip, including a processor and a communication interface, where the communication interface is coupled to the processor, and the processor is configured to run a program or instructions of a terminal to implement the processes of the foregoing embodiment of the transmission method, or implement the processes of the foregoing embodiment of the priority definition method, and the same technical effects can be achieved. To avoid repetition, details are not described herein again.

It should be understood that, the chip mentioned in the embodiments of the present application may also be referred to as a system-level chip, a system chip, a chip system, a system on chip, or the like.

It is to be noted that, the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one . . . " does not exclude that there are still other same elements in the processes, methods, objects, or apparatuses. In addition, it is to be noted that the scope of the methods and apparatuses in the implementations of the present application is not limited to performing functions in the shown or discussed order, and may further include performing functions in a substantially simultaneous manner or in a reverse order according to the functions involved. For example, the described methods may be performed in an order different from that described, and various steps may be added, omitted, or combined. In addition, features described with reference to some examples may also be combined in other examples.

Through the descriptions of the foregoing implementations, a person skilled in the art may clearly understand that the method according to the foregoing embodiments may be implemented through software and a necessary general hardware platform, and certainly, may alternatively be implemented by hardware, but in many cases, the former manner is a better implementation. Based on such an understanding, the technical solutions of the present application essentially or the part contributing to the prior art may be implemented in the form of a software product. The computer software product is stored in a storage medium (such as a ROM/RAM, a magnetic disk, or an optical disc) and includes several instructions for instructing a terminal (which may be a mobile phone, a computer, a server, an air conditioner, a network-side device, or the like) to perform the methods described in the embodiments of the present application.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but such implementation is not to be considered beyond the scope of the present disclosure.

A person skilled in the art may clearly understand that for convenience and conciseness of description, for specific working processes of the foregoing systems, apparatuses and units, reference may be made to the corresponding processes in the foregoing method embodiments, and details are not described herein again.

In the embodiments provided in the present application, it is to be understood that the disclosed apparatus and method may be implemented in other manners. For example, the described apparatus embodiment is merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may be physically separated, or two or more units may be integrated into one unit.

When the functions are implemented in the form of a software functional unit and sold or used as an independent product, the functions may be stored in a computer readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, and the like) to perform all or some of the steps of the methods described in the embodiments of the present disclosure. The foregoing storage medium includes: any medium that can store program code, such as a USB flash drive, a removable hard disk, a ROM, a RAM, a magnetic disk, or an optical disc.

A person of ordinary skill in the art may understand that all or some of the processes of the methods in the foregoing embodiments may be implemented by a computer program controlling relevant hardware. The program may be stored in a computer-readable storage medium. During the execution of the program, processes of the foregoing method embodiments may be included. The storage medium may be a magnetic disk, an optical disc, a read-only memory (ROM), a random access memory (RAM), or the like.

The embodiments of the present application are described above with reference to the accompanying drawings. However, the present application is not limited to the foregoing specific implementations. The foregoing specific implementations are merely illustrative rather than limitative. A person of ordinary skill in the art may derive various forms from the present application without departing from the spirit of the present application and the scope claimed by the claims, which are fall within the protection of the present application.

What is claimed is:

1. A transmission method, applicable to a communication device, the method comprising:

determining target transmission when a target resource and a first resource at least partially overlap, meet a collision condition, or meet a multiplexing condition, wherein the target resource is related to a sidelink (SL), the target resource has or does not have a first Uu priority, the first resource has a second Uu priority, and the first Uu priority of the target resource comprises a Uu priority of the target resource and/or a Uu priority of at least part of information corresponding to the target resource, wherein the target resource has or does not have the first Uu priority, the first resource has the second Uu priority, and the determining target transmission comprises at least one of the following:

skipping transmitting the at least part of information corresponding to the target resource in a case that the second Uu priority of the first resource is a first priority; or transmitting the at least part of information corresponding to the target resource in a case that the second Uu priority of the first resource is a second priority, wherein the first priority is a high priority, or corresponds to a high priority value, or is priority index 1, and the second priority is a low priority, or corresponds to a low priority value, or is priority index 0.

2. The method according to claim 1, wherein the first priority is higher than the second priority, or a priority value of the first priority is higher than a priority value of the second priority.

3. The method according to claim 1 wherein the target resource comprises one or more of the following:

a resource on which a target object is located, wherein the target object comprises an SL channel, an SL signal, SL signaling, SL information, and/or an SL message;

a Uu channel, signal, and/or resource used for transmitting or indicating target content, wherein the target content comprises the SL signal, the SL signaling, the SL information, and/or the SL message;

SL hybrid automatic repeat request acknowledgement HARQ-ACK; or an uplink resource carrying the SL HARQ-ACK;

wherein the first resource is a physical uplink control channel PUCCH and/or physical uplink shared channel PUSCH resource.

4. The method according to claim 1, wherein that the first resource has a second Uu priority is determined according to at least one of the following:

a network side schedules, configures, or indicates the second Uu priority of the first resource; or the second Uu priority of the first resource is predefined or pre-configured; or, wherein that the first resource does not have a second Uu priority is determined according to at least one of the following:

a network side schedules, configures, or indicates no second Uu priority of the first resource; or no second Uu priority of the first resource is predefined or pre-configured.

5. The method according to claim 1, wherein the first resource is used for at least one of the following:

URLLC transmission;

transmission greater than a priority threshold;

transmission meeting a reliability requirement;

transmission less than a delay threshold and having a packet delay budget PDB less than a PDB threshold or a remaining PDB less than a remaining PDB threshold;

eMBB transmission;

transmission less than a priority threshold;

transmission not meeting a reliability requirement; or transmission higher than a delay threshold and having a PDB greater than a PDB threshold or a remaining PDB greater than a remaining PDB threshold.

6. The method according to claim 1, further comprising:

determining the first Uu priority of the target resource according to a first SL priority of the target resource based on a mapping relationship, wherein the first SL priority of the target resource comprises: an SL priority of the target resource and/or a sidelink SL priority of the at least part of information corresponding to the target resource.

7. The method according to claim 1, wherein the first Uu priority of the target resource is a specific priority;

or in a case that the first SL priority of the target resource meets a specific condition, the first Uu priority of the target resource is a specific priority.

8. The method according to claim 7, wherein in a case that the first SL priority of the target resource meets a first condition, the first Uu priority of the target resource is a first priority;

and/or in a case that the first SL priority of the target resource meets a second condition, the first Uu priority of the target resource is a second priority;

wherein the first condition comprises one or more of the following:

the first SL priority of the target resource is higher than or equal to a first preset priority;

a first SL priority value of the target resource is less than or equal to a first preset priority value;

no second preset priority and/or second preset priority value is configured or acquired; or the second condition is not met;

wherein the second condition comprises one or more of the following:

the first SL priority of the target resource is higher than or equal to a third preset priority;

a first SL priority value of the target resource is less than or equal to a third preset priority value;

no fourth preset priority and/or fourth preset priority value is configured or acquired;

the first SL priority of the target resource is lower than or equal to a fifth preset priority;

a first SL priority value of the target resource is greater than or equal to a fifth preset priority value; or the first condition is not met.

9. The method according to claim 1, wherein the first Uu priority of target resource comprises one or more of the following:

a first specific Uu priority in the Uu priority of the at least part of information corresponding to the target resource;

a Uu priority corresponding to a specific SL priority in an SL priority of the at least part of information corresponding to the target resource; or the Uu priority of the at least part of information corresponding to the target resource; or, wherein a first Uu priority value of the target resource comprises one or more of the following:

a first specific Uu priority value in a Uu priority value of the at least part of information corresponding to the target resource;

a Uu priority value corresponding to a specific SL priority value in an SL priority value of the at least part of information corresponding to the target resource; or a Uu priority value of the at least part of information corresponding to the target resource.

10. The method according to claim 1, wherein the target resource has the first Uu priority, the first resource has the second Uu priority, and the determining target transmission comprises at least one of the following:

transmitting the at least part of information corresponding to the target resource in a case that the first Uu priority of the target resource is the same as the second Uu priority of the first resource or a difference value therebetween is less than a first preset difference value; or skipping transmitting the at least part of information corresponding to the target resource in a case that the first Uu priority of the target resource is different from the second Uu priority of the first resource or a difference value therebetween is greater than a second preset difference value.

11. The method according to claim 1, wherein the target resource has the first Uu priority, the first resource has or does not have the second Uu priority, and the determining target transmission comprises at least one of the following:

transmitting the at least part of information corresponding to the target resource in a case that the first Uu priority of the target resource is higher than or equal to a first specific priority, and/or lower than or equal to a second specific priority; or skipping transmitting the at least part of information corresponding to the target resource in a case that the first Uu priority of the target resource is higher than or equal to a third specific priority, and/or lower than or equal to a fourth specific priority; or, wherein the target resource has or does not have the first Uu priority, the first resource has the second Uu priority, and the determining target transmission comprises at least one of the following:

transmitting the at least part of information corresponding to the target resource in a case that the second Uu priority of the first resource is a first priority; or skipping transmitting the at least part of information corresponding to the target resource in a case that the second Uu priority of the first resource is a second priority, wherein the first priority is higher than the second priority.

12. The method according to claim 1, wherein the determining target transmission comprises at least one of the following:

transmitting the at least part of information corresponding to the target resource;

transmitting the at least part of information corresponding to the target resource in a case that a first SL priority of the target resource is higher than or equal to a fifth specific priority, and/or lower than or equal to a sixth specific priority; or skipping transmitting the at least part of information corresponding to the target resource in a case that a first SL priority of the target resource is higher than or equal to a seventh specific priority, and/or lower than or equal to an eighth specific priority.

13. The method according to claim 1, wherein the determining target transmission comprises:

transmitting the at least part of information corresponding to the target resource in a case that the first resource has the second Uu priority, and/or first control signaling carries priority indication information, wherein the first control signaling is used for scheduling, configuring, or indicating the first resource; or, wherein the determining target transmission comprises:

transmitting the at least part of information corresponding to the target resource in a case that the first resource does not have the second Uu priority, and/or first control signaling carries no priority indication information, wherein the first control signaling is used for scheduling, configuring, or indicating the first resource.

14. A priority definition method, applicable to a communication device, the method comprising:

configuring or acquiring a mapping relationship between a first Uu priority and a first SL priority of a target resource; and determining the first Uu priority of the target resource according to the mapping relationship, wherein the target resource is related to an SL, the target resource has or does not have a first Uu priority, and the first Uu priority of the target resource comprises: a Uu priority of the target resource and/or a Uu priority of at least part of information corresponding to the target resource; and the first SL priority of the target resource comprises: an SL priority of the target resource and/or an SL priority of the at least part of information corresponding to the target resource;

wherein the target resource has or does not have the first Uu priority, a first resource has a second Uu priority, and determining target transmission when the target resource and the first resource at least partially overlap, meet a collision condition, or meet a multiplexing condition comprises at least one of the following:

skipping transmitting the at least part of information corresponding to the target resource in a case that the second Uu priority of the first resource is a first priority; or transmitting the at least part of information corresponding to the target resource in a case that the second Uu priority of the first resource is a second priority, wherein the first priority is a high priority, or corresponds to a high priority value, or is priority index 1, and the second priority is a low priority, or corresponds to a low priority value, or is priority index 0.

15. A communication device, comprising: a processor, a memory, and a program or instructions stored on the memory and executable on the processor, the program or instructions, when executed by the processor, implementing steps of the transmission method claim 14.

16. The method according to claim 14, wherein the first priority is higher than the second priority, or a priority value of the first priority is higher than a priority value of the second priority.

17. The method according to claim 14 wherein the target resource comprises one or more of the following:

a resource on which a target object is located, wherein the target object comprises an SL channel, an SL signal, SL signaling, SL information, and/or an SL message;

a Uu channel, signal, and/or resource used for transmitting or indicating target content, wherein the target content comprises the SL signal, the SL signaling, the SL information, and/or the SL message;

SL hybrid automatic repeat request acknowledgement HARQ-ACK; or an uplink resource carrying the SL HARQ-ACK;

wherein the first resource is a physical uplink control channel PUCCH and/or physical uplink shared channel PUSCH resource.

18. A communication device, comprising: a processor, a memory, and a program or instructions stored on the memory and executable on the processor, the program or instructions, when executed by the processor, implementing following steps:

determining target transmission when a target resource and a first resource at least partially overlap, meet a collision condition, or meet a multiplexing condition, wherein the target resource is related to a sidelink (SL), the target resource has or does not have a first Uu priority, the first resource has a second Uu priority, and the first Uu priority of the target resource comprises a Uu priority of the target resource and/or a Uu priority of at least part of information corresponding to the target resource, wherein the target resource has or does not have the first Uu priority, the first resource has the second Uu priority, and the determining target transmission comprises at least one of the following:

skipping transmitting the at least part of information corresponding to the target resource in a case that the second Uu priority of the first resource is a first priority; or transmitting the at least part of information corresponding to the target resource in a case that the second Uu priority of the first resource is a second priority, wherein the first priority is a high priority, or corresponds to a high priority value, or is priority index 1, and the second priority is a low priority, or corresponds to a low priority value, or is priority index 0.

19. The communication device according to claim 18, wherein the first priority is higher than the second priority, or a priority value of the first priority is higher than a priority value of the second priority.

20. The communication device according to claim 18, wherein the target resource comprises one or more of the following:

a resource on which a target object is located, wherein the target object comprises an SL channel, an SL signal, SL signaling, SL information, and/or an SL message;

a Uu channel, signal, and/or resource used for transmitting or indicating target content, wherein the target content comprises the SL signal, the SL signaling, the SL information, and/or the SL message;

SL hybrid automatic repeat request acknowledgement HARQ-ACK; or an uplink resource carrying the SL HARQ-ACK;

wherein the first resource is a physical uplink control channel PUCCH and/or physical uplink shared channel PUSCH resource.

\* \* \* \* \*